(12) United States Patent
Plater

(10) Patent No.: US 9,815,554 B2
(45) Date of Patent: Nov. 14, 2017

(54) UNMANNED AERIAL VEHICLE

(71) Applicant: Lance Butler Plater, Solvang, CA (US)

(72) Inventor: Lance Butler Plater, Solvang, CA (US)

( * ) Notice: Subject to any disclaimer, the term of this patent is extended or adjusted under 35 U.S.C. 154(b) by 238 days.

(21) Appl. No.: 14/858,179

(22) Filed: Sep. 18, 2015

(65) Prior Publication Data

US 2017/0036748 A1 Feb. 9, 2017

Related U.S. Application Data

(60) Provisional application No. 62/201,574, filed on Aug. 6, 2015.

(51) Int. Cl.
*B64C 1/00* (2006.01)
*B64C 39/02* (2006.01)

(52) U.S. Cl.
CPC ...... *B64C 39/024* (2013.01); *B64C 2201/028* (2013.01); *B64C 2201/104* (2013.01); *B64C 2201/126* (2013.01); *B64C 2201/145* (2013.01); *B64C 2201/148* (2013.01); *B64C 2211/00* (2013.01); *B64D 2221/00* (2013.01)

(58) Field of Classification Search
CPC ............ B64C 39/024; B64C 2201/028; B64C 2201/104; B64C 2201/126; B64C 2201/145; B64C 2201/146; B64C 2211/00; B64D 2221/00
See application file for complete search history.

(56) References Cited

U.S. PATENT DOCUMENTS

| | | | | |
|---|---|---|---|---|
| 8,500,067 B2* | 8/2013 | Woodworth | ........... | B64D 27/26 244/110 H |
| 8,951,086 B2* | 2/2015 | Woodworth | ........... | B64D 27/26 244/12.4 |
| 8,967,527 B2* | 3/2015 | Woodworth | ........... | B64D 27/26 244/124 |
| 9,114,871 B2* | 8/2015 | Woodworth | ........... | B64D 27/26 |
| 2013/0175390 A1* | 7/2013 | Woodworth | ........... | B64D 27/26 244/54 |
| 2014/0054423 A1* | 2/2014 | Woodworth | ........... | B64D 27/26 244/23 D |
| 2014/0061384 A1* | 3/2014 | Woodworth | ........... | B64D 27/26 244/120 |
| 2014/0061390 A1* | 3/2014 | Woodworth | ........... | B64D 27/26 244/23 D |
| 2015/0014482 A1* | 1/2015 | Weierman | ............... | H02S 10/40 244/124 |

* cited by examiner

*Primary Examiner* — Philip J Bonzell
(74) *Attorney, Agent, or Firm* — Patentfile, LLC; Bradley C. Fach; Steven R. Kick

(57) ABSTRACT

An unmanned aerial vehicle (UAV) which in some embodiments may comprise a fuselage which includes a cavity formed by an interior cavity wall and a fuselage exterior wall, with the cavity disposed within the fuselage. A first electronic module may be electrically coupled to a first magnetic connector and a second electronic module may be electrically coupled to a second magnetic connector. Electronic communication between the first and second modules may be provided by contact between the first magnetic connector and the second magnetic connector. In further embodiments, when removably positioned adjacent to each other in the cavity, the first magnetic connector may contact the second magnetic connector to establish electronic communication between the first and second modules.

16 Claims, 19 Drawing Sheets

US 9,815,554 B2

UNMANNED AERIAL VEHICLE

CROSS REFERENCE TO RELATED APPLICATIONS

This application claims priority to and the benefit of the filing date of U.S. Provisional Application No. 62/201,574 filed on Aug. 6, 2015, entitled "UAV with Magnetic Detachable Wire Ports", which is hereby incorporated by reference in its entirety.

FIELD OF THE INVENTION

This patent specification relates to the field of unmanned aerial vehicles and aerial drones. More specifically, this patent specification relates to unmanned aerial vehicles and aerial drones comprising rapidly reconfigurable components.

BACKGROUND

While unmanned aerial vehicles (UAVs), commonly known as "drones", have become a popular hobbyist tool for their ease of flying, recently UAVs have become widely utilized in a variety of industries. Controlled by an operator from a ground transmitter, UAVs can perform a wide variety of purposes, including, but not limited to: crop monitoring, Search and Rescue, and inspecting manmade structures and natural formations.

In known devices, UAVs have a complex system of six or more electrical modules which allow the UAV to be controlled from the ground. These electronic modules may include an engine module or motor, a battery module, a radio receiver module, an engine speed control unit module, and communications modules, such as GPS positioning modules, autopilot modules, and the like. Additionally, a plurality of other electronic modules with a plurality of other functions may be included in a UAV. In the case of replacing modules or charging batteries, the wiring must be disassembled. This means of disassembly further complicates the process of connecting and disconnecting the wires and adjusting the center of gravity to satisfy the aerodynamic profile of said UAV. Not only is this disassembly and assembly time consuming, but it also results in increased wear and tear on the UAV and the electronic modules.

Therefore, a need exists for novel unmanned aerial vehicles. There is a further need for novel unmanned aerial vehicles that reduce the amount of time required for the disassembly and assembly of the unmanned aerial vehicles. Finally, there exists a need for novel unmanned aerial vehicles that decrease the amount of wear and tear on the UAV and the electronic modules from repeated disassembly and assembly.

BRIEF SUMMARY OF THE INVENTION

An unmanned aerial vehicle (UAV) is provided. In some embodiments, the UAV may comprise a fuselage which includes a cavity formed by an interior cavity wall and a fuselage exterior wall, with the cavity disposed within the fuselage. A first electronic module may be electrically coupled to a first magnetic connector and a second electronic module may be electrically coupled to a second magnetic connector. Electronic communication between the first and second modules may be provided by contact between the first magnetic connector and the second magnetic connector.

In further embodiments, a magnetic connector may comprise a first electrically conductive magnet at a first end.

In still further embodiments, a magnetic connector may comprise a second electrically conductive magnet at a second end.

In still further embodiments, a magnetic connector may comprise a spring with a first end and a second end, and the first end of the spring may be coupled to the first end of the magnetic connector and the second end of the spring may be coupled to the second end of the magnetic connector.

In even further embodiments, the first electronic module and the second electronic module may be removably positioned within the cavity.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

It should be understood that for the purposes of understanding the orientation of individual components of the invention, the term "front" shall generally be used to indicate a surface or surface of a component that when assembled in an unmanned aerial vehicle, is orientated generally toward the nose of an unmanned aerial vehicle. Conversely, for the purposes of understanding the orientation of individual elements of the invention, the term "back" shall generally be used to indicate a surface or a surface of a component that when assembled in an unmanned aerial vehicle, is orientated generally towards the tail of the unmanned aerial vehicle.

Figure 1:
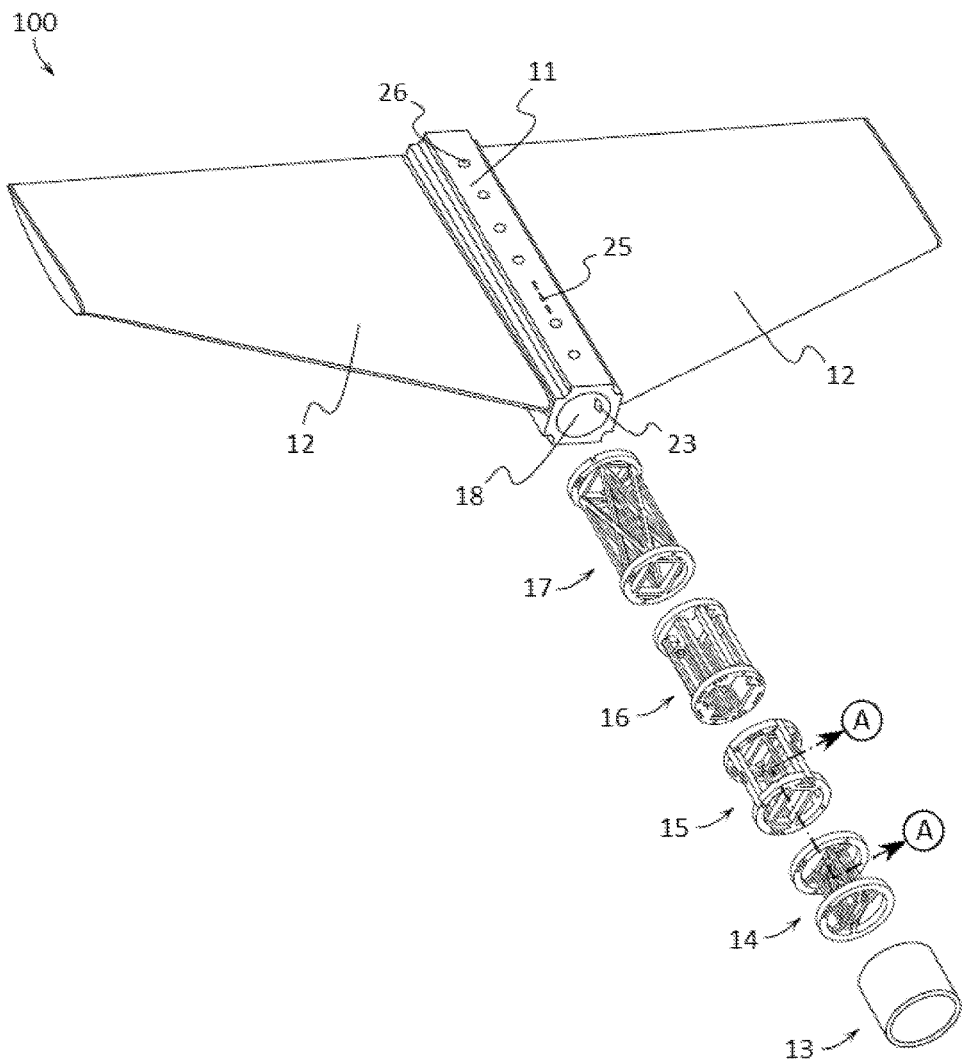
FIG. 1 depicts a perspective view of an example of some of the components of an unmanned aerial vehicle according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

New unmanned aerial vehicles (UAVs), commonly known as "drones", are discussed herein. UAV's may include but are not limited to fixed wing type aircraft as well as non-fixed wing aircraft such as rotary type aircraft (i.e. helicopters with one or more rotating lift blades). In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIG. 1 illustrates an example of an unmanned aerial vehicle ("the UAV") 100 according to various embodiments. In this example, the UAV 100 comprises a fuselage 11, two airfoils 12, and one or more housing elements, such as an engine module housing element 13, engine speed control module housing element 14, receiver module housing element 15, communications module housing element 16, and a battery module housing element 17. The fuselage 11 may comprise a cavity 18 which may be configured to receive one or more housing elements 13, 14, 15, 16, 17.

Figure 2:
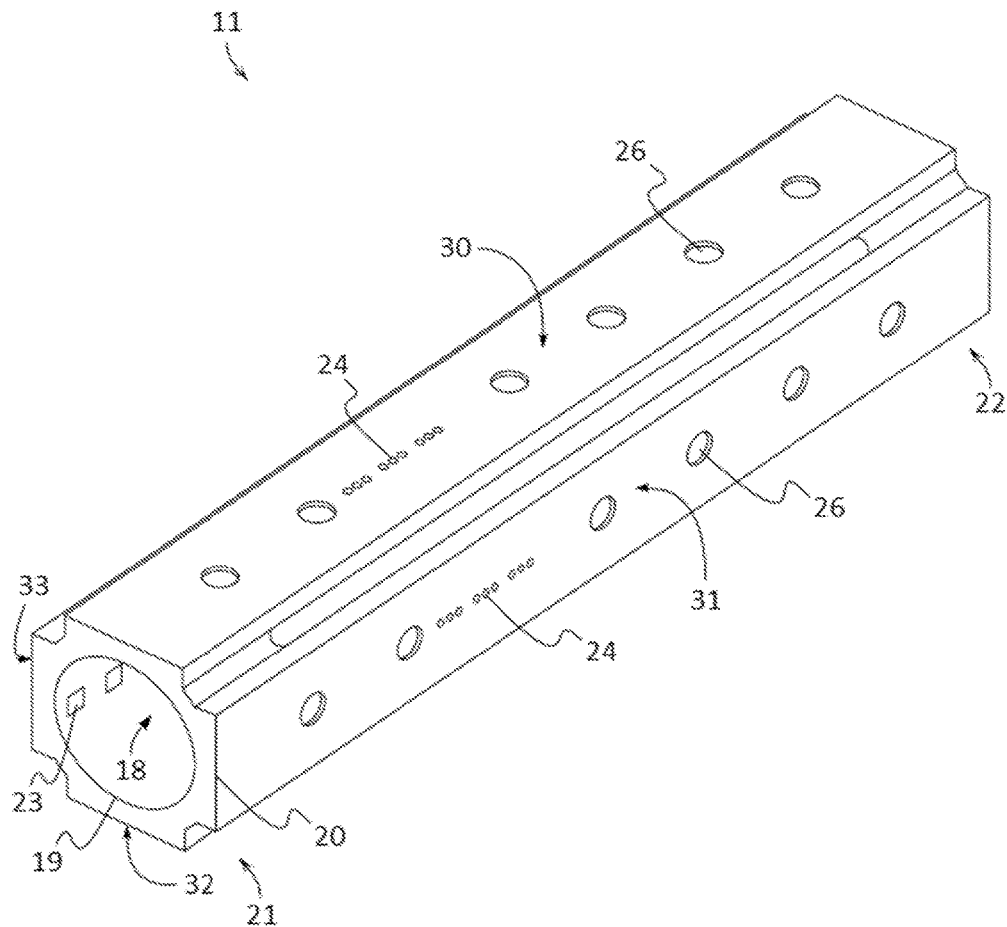
FIG. 2 illustrates a perspective view of an example of a fuselage according to various embodiments described herein.

FIG. 2 illustrates a perspective view of an example of a fuselage 11 according to various embodiments described herein. In some embodiments, the fuselage 11 may comprise cavity 18 which may be formed by an interior cavity wall 19 and a fuselage exterior wall 20. The cavity 18 may be disposed, such as centrally, within the fuselage 11. In some embodiments, the cavity 18 may extend a portion of the length of the fuselage 11, while in other embodiments, the cavity may extend from a first end 21 of the fuselage 11 to a second end 22 of the fuselage 11. In other embodiments, the fuselage 11 may comprise two or more cavities 18.

The fuselage 11 may be configured in a plurality of sizes and shapes. In some embodiments, the fuselage 11 may comprise one or more exterior surfaces, such as a first exterior surface 30, a second exterior surface 31, a third exterior surface 32, and a fourth exterior surface 33. Each exterior surface 30, 31, 32, 33, may be configured to be coupled to an airfoil 12. In further embodiments, two or more airfoil 12 may be coupled to an exterior surface 30, 31, 32, 33. In still further embodiments, the length of the fuselage 11 may exceed, such as by one fourth, the combined length of the housing elements 13, 14, 15, 16, 17, desired to be inserted into the cavity 18 in order to account for adjustments of the center of gravity.

Figure 5:
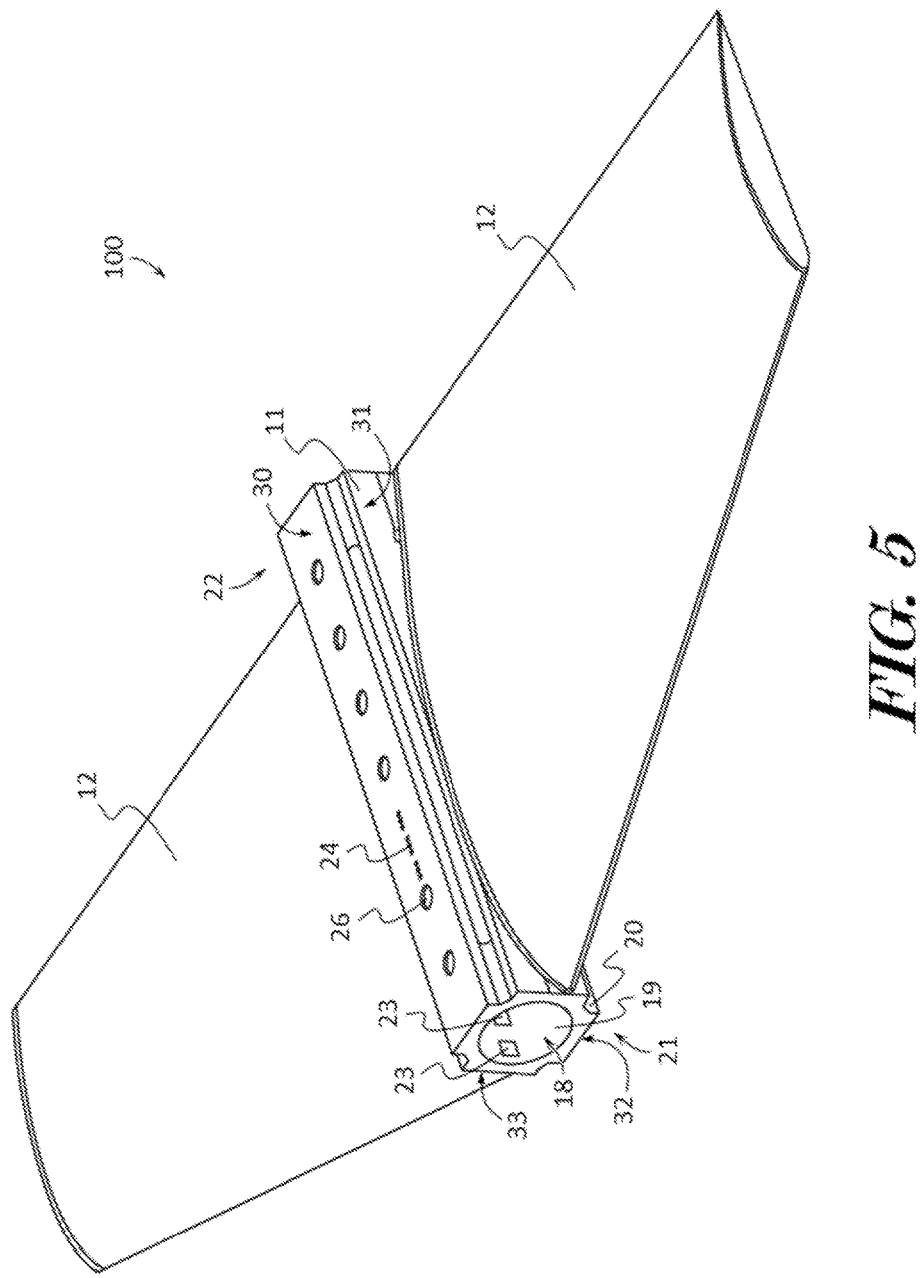
FIG. 5 illustrates a perspective view of an example of two airfoils coupled to an example of a fuselage according to various embodiments described herein.

The cavity 18 may be configured in a plurality of shapes such as a generally cylindrical shape, as depicted in FIGS. 1, 2, and 5, thereby allowing the cavity 18 to receive one or more generally cylindrical shaped housing elements 13, 14, 15, 16, 17. In other embodiments, a cavity 18 may be configured with any other elongated shape which may be complementary to the shape of one or more cylindrical shaped housing elements 13, 14, 15, 16, 17, which may preferably be inserted in series into the cavity 18.

In some embodiments, the fuselage 11 may comprise an internal positioning magnet 23 coupled to the interior cavity wall 19. An internal positioning magnet 23 may be coupled to the interior cavity wall 19 by being fastened, adhered, molded, integrally formed, or otherwise coupled to the interior cavity wall 19 or within the fuselage 11 such as between the interior cavity wall 19 and the fuselage exterior wall 20. In further embodiments, the fuselage 11 may comprise two, three, four, five, six, seven, eight, nine, ten or more, such as a plurality of internal positioning magnets 23, which may be coupled to the interior cavity wall 19. In still further embodiments, the fuselage 11 may comprise a plurality of internal positioning magnets 23 and the plurality of internal positioning magnets 23 may comprise a first set of internal positioning magnets 23 and a second set of internal positioning magnets 23. A set of internal positioning magnets 23 may be formed by a number of internal positioning magnets 23 which may be grouped together such as in a linear series. In some embodiments, a first set of internal positioning magnets 23 may be coupled to the interior cavity wall 19 and a second set of internal positioning magnets 23 may be coupled to an opposing portion of the interior cavity wall 19. In other embodiments, a first set of internal positioning magnets 23 may be coupled to the interior cavity wall 19 and a second set of internal positioning magnets 23 may be coupled to any other portion of the interior cavity wall 19.

As shown in FIGS. 1, 2, and 5, in some embodiments, the fuselage 11 may comprise a connection port 24 which extends through the fuselage from the interior cavity wall 19 to the fuselage exterior wall 20. In further embodiments, the fuselage 11 may comprise two, three, four, five, six, seven, eight, nine, ten or more, such as a plurality of connection ports 24 which may extend through the fuselage 11 from the interior cavity wall 19 to the fuselage exterior wall 20. Each connection port 24 may be configured to receive a magnetic connector 51 (FIGS. 21-24) and the one or more connection ports 24 may be positioned anywhere on the fuselage 11. In further embodiments, two or more connection ports 24 may be positioned adjacent to each other to form a set of connection ports 25.

In some embodiments, the fuselage 11 may comprise an external positioning magnet 26 which may be coupled to the fuselage exterior wall 20. An external positioning magnet 26 may be coupled to the fuselage exterior wall 20 by being fastened, adhered, molded, integrally formed, or otherwise coupled to the fuselage exterior wall 20 or within the fuselage 11 such as between the interior cavity wall 19 and the fuselage exterior wall 20. In further embodiments, the fuselage 11 may comprise two, three, four, five, six, seven, eight, nine, ten or more, such as a plurality of external positioning magnets 26, which may be coupled to fuselage exterior wall 20. In still further embodiments, the fuselage 11 may comprise a plurality of external positioning magnets 26 and the plurality of external positioning magnets 26 may comprise a first set of external positioning magnets 26 and a second set of external positioning magnets 26. A set of external positioning magnets 26 may be formed by a number of external positioning magnets 26 which may be grouped together such as in a linear series. In some embodiments, a first set of external positioning magnets 26 may be coupled to the fuselage exterior wall 20, such as to a first exterior surface 30, and a second set of external positioning magnets 26 may be coupled to an opposing portion of the fuselage exterior wall 20, such as to a third exterior surface 32. In other embodiments, a first set of external positioning magnets 26 may be coupled to the fuselage exterior wall 20 and a second set of external positioning magnets 26 may be coupled to any other portion of the fuselage exterior wall 20.

Figure 3:
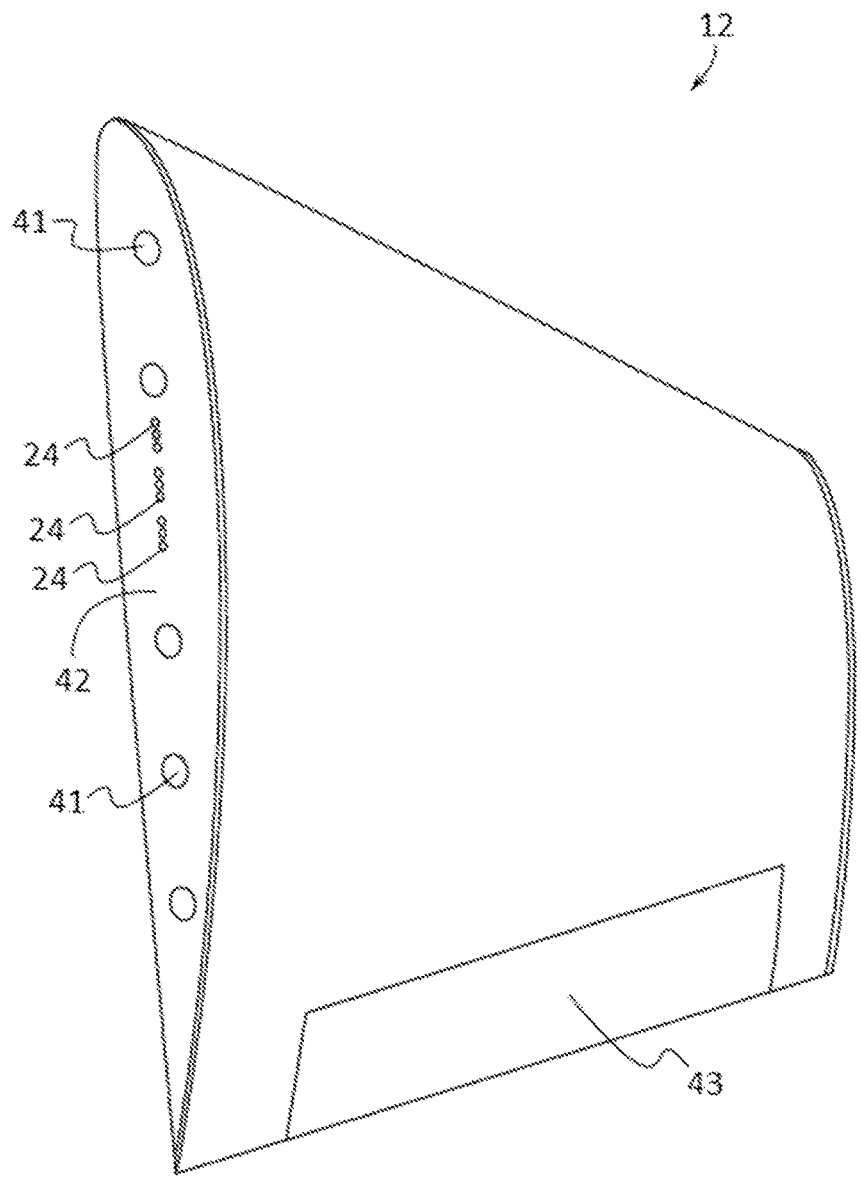
FIG. 3 shows a perspective view of an example of an airfoil according to various embodiments described herein.

Turning now to FIG. 3, a perspective view of an example of an airfoil 12 according to various embodiments described herein, is shown. In some embodiments, an airfoil 12 may comprise an airfoil positioning magnet 41. The airfoil 12 may also comprise a fuselage contacting surface 42 and one or more airfoil positioning magnets 41 may be coupled to the fuselage contacting surface 42. In further embodiments, an airfoil 12 may comprise may comprise two, three, four, five, six, seven, eight, nine, ten or more, such as a plurality of airfoil positioning magnets 41, which may be coupled to fuselage contacting surface 42. In still further embodiments, an airfoil 12 may comprise one or more airfoil positioning magnets 41 may be positioned on a fuselage contacting surface 42 in a complementary orientation to one or more external positioning magnets 26 on the fuselage 11. By positioning the airfoil positioning magnets 41 on the fuselage contacting surface 42 of an airfoil 12 proximate to or in contact with the external positioning magnets 26 on an exterior surface 30, 31, 32, 33, of the fuselage 11, the airfoil 12 and the fuselage 11 may be coupled together by the magnetic attraction of the one or more air foil positioning magnets 41 and the one or more external positioning magnets 26.

As is also shown in FIG. 3, in some embodiments, an airfoil 12 may comprise a connection port 24 which extends through the fuselage contacting surface 42 and into the interior of the airfoil 12. In further embodiments, an airfoil 12 may comprise two, three, four, five, six, seven, eight, nine, ten or more, such as a plurality of connection ports 24 which may extend through the fuselage contacting surface 42 and into the interior of the airfoil 12. Each connection port 24 may be configured to receive a magnetic connector 51 (FIGS. 21-24) and the one or more connection ports 24 may be positioned anywhere on the fuselage contacting surface 42 of the airfoil 12. In further embodiments, two or more connection ports 24 may be positioned adjacent to each other to form a set of connection ports 25.

Figure 4:
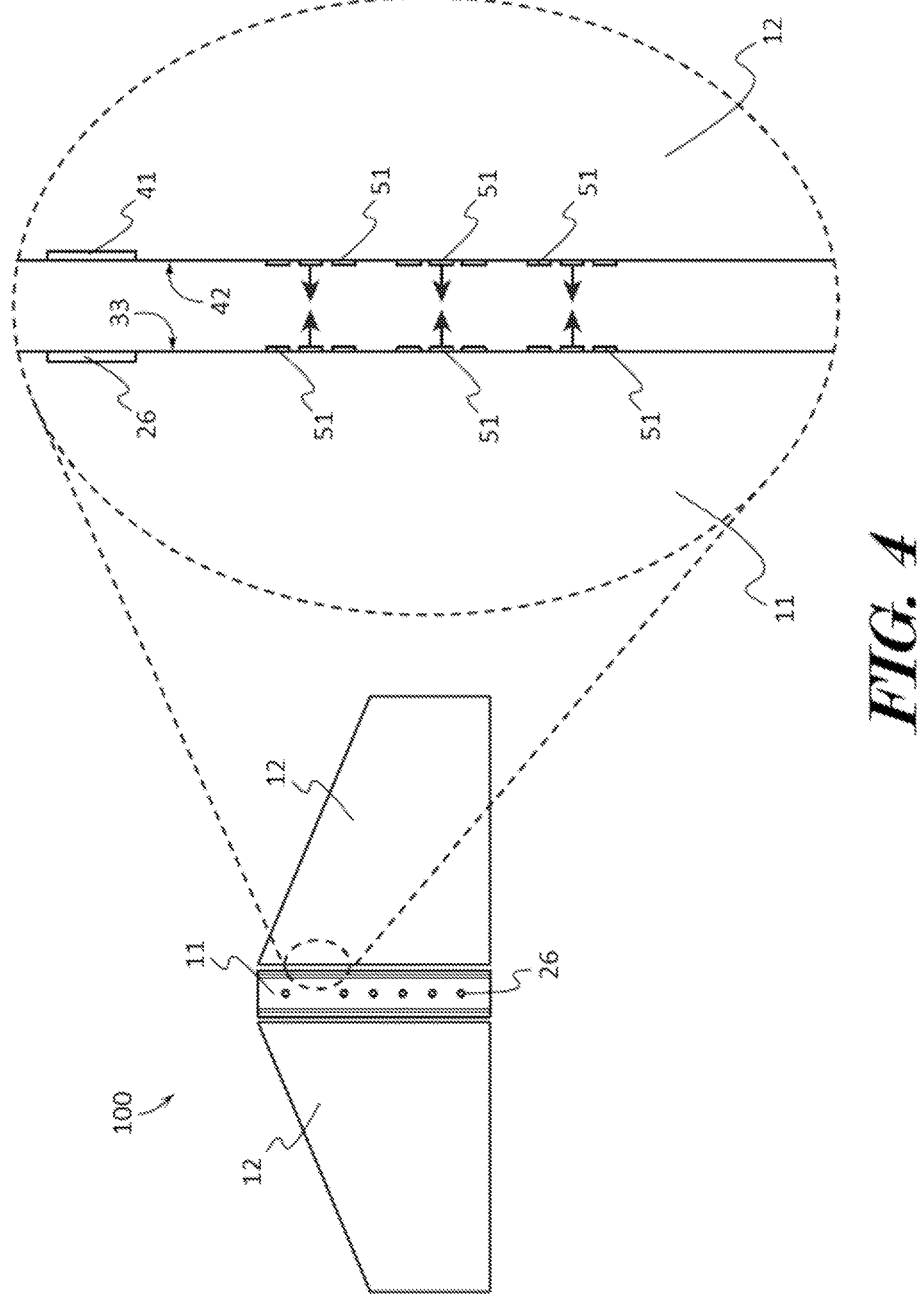
FIG. 4 depicts an enlarged plan view of an example of an airfoil and an example of a fuselage according to various embodiments described herein.

Each connection port 24 on the fuselage 11 and on each airfoil 12 may be configured to receive a magnetic connector 51 (FIGS. 3, 21-24). A magnetic connector 51 may be inserted or received into a connection port 24 on the fuselage 11 allowing the magnetic connector 51 to extend through the fuselage from the interior cavity wall 19 to the fuselage exterior wall 20. Likewise, a magnetic connector 51 may be inserted or received into a connection port 24 on an airfoil 12 allowing the magnetic connector 51 to extend through the fuselage contacting surface 42 and into the interior of the airfoil 12. As shown in FIG. 4, a magnetic connector 51 is inserted into each connector port 24 on the fuselage 11 so that only a portion of one end of each magnetic connector 51 is visible. Similarly, a magnetic connector 51 is inserted into each connector port 24 on the airfoil 12 so that only a portion of one end of each magnetic connector 51 is visible. The one or more connection ports 24 on fuselage 11 and on each airfoil 12 may be complementarily positioned so that when an airfoil 12 and the fuselage 11 are coupled together by the magnetic attraction of one or more air foil positioning magnets 41 and one or more external positioning magnets 26, the connection ports 24 on fuselage 11 may be aligned with the connection ports 24 on the airfoil 12, thereby allowing the magnetic connectors 51 received in the connection ports 24 on the fuselage 11 to contact the magnetic connectors 51 received in the connection ports 24 on the airfoil 12.

Figure 6:
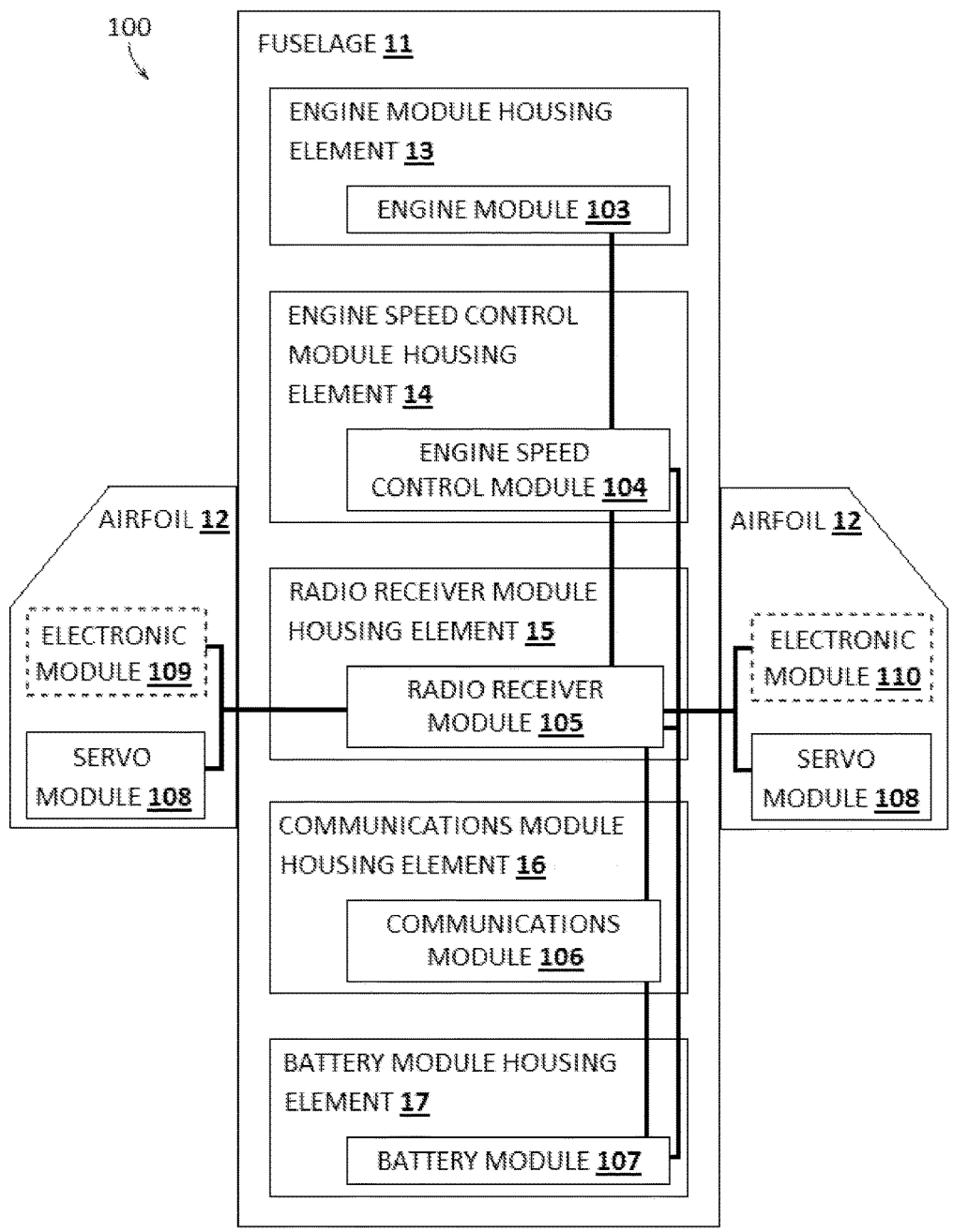
FIG. 6 shows a block diagram of some components of an example of an unmanned aerial vehicle according to various embodiments described herein.
Figure 22:
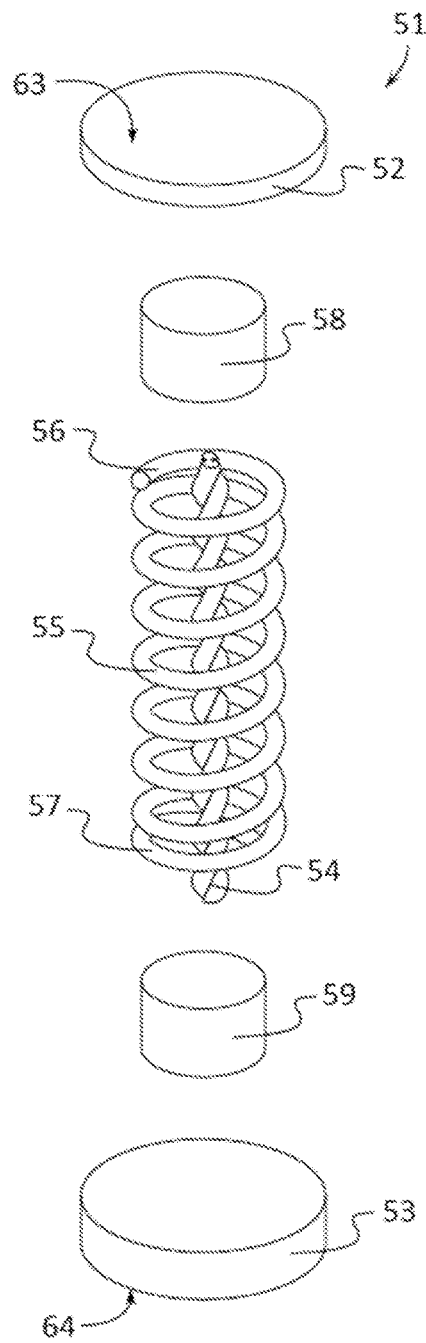
FIG. 22 depicts a perspective exploded view of an example of a magnetic connector according to various embodiments described herein.
Figure 23:
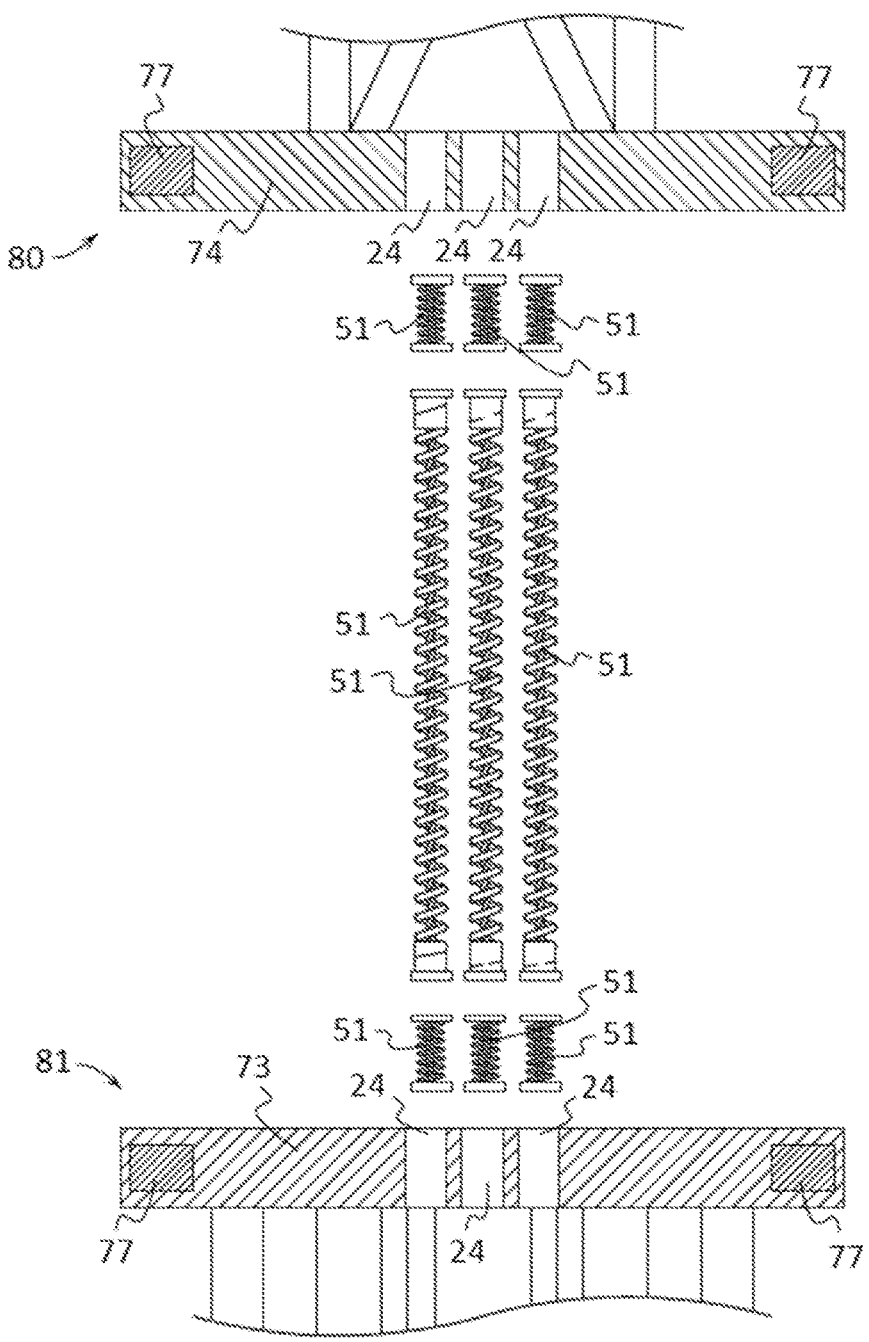
FIG. 23 illustrates a sectional, through line A-A shown in FIG. 1, elevation view of a first housing element and a second housing element according to various embodiments described herein.
Figure 24:
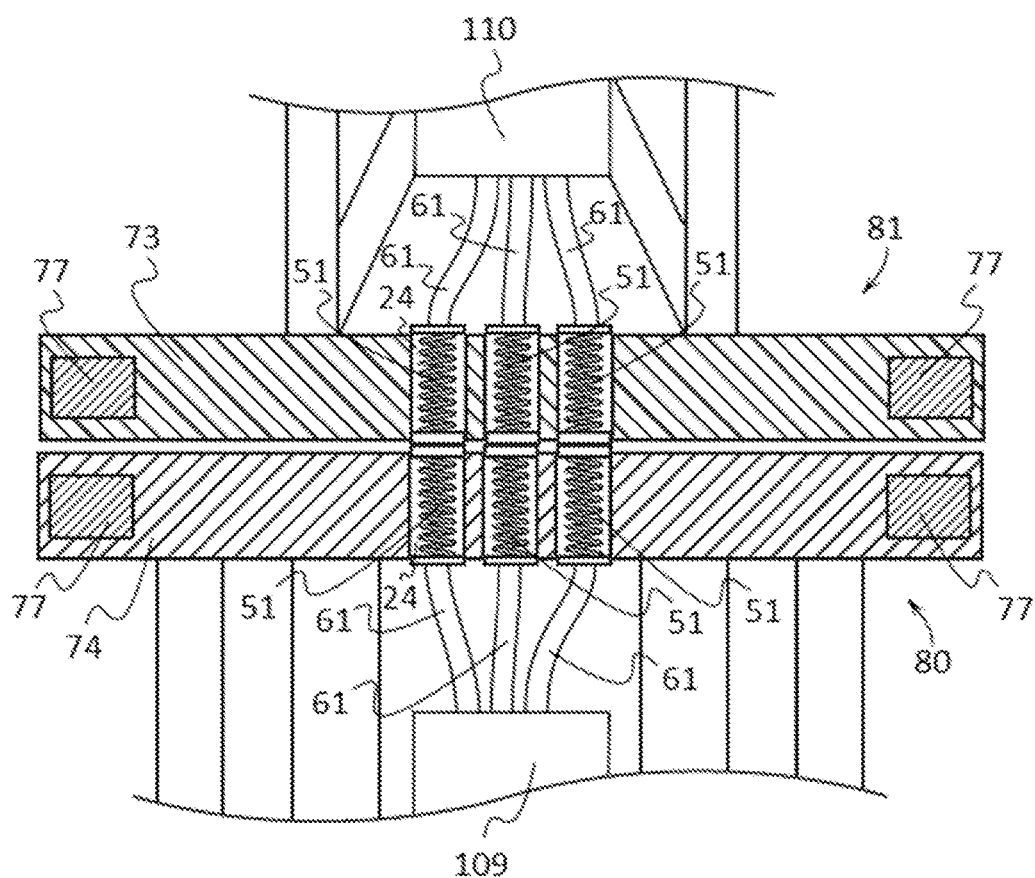
FIG. 24 shows a sectional, through line A-A shown in FIG. 1, elevation view of a first housing element in electrical communication with a second housing element according to various embodiments described herein.

In some embodiments, an airfoil 12 may optionally comprise one or more electronic modules, such as an optional first electronic module 109 (FIGS. 6, 23, and 24) and/or an optional second electronic module 110 (FIGS. 6, 23, and 24). A first electronic module 109 a second electronic module 110 may be an engine module 103, an engine speed control unit module 104, a radio receiver module 105, a communications module 106, a battery module 107, a servo module 108, and/or any other type of electronic module. In further embodiments, an electronic module 109, 110, may comprise any electronic component suitable for being transported by a drone, such as an electronic module comprising a camera, an electronic module comprising one or more sensors, an electronic module comprising a material dispersion device, and/or any other type of electronic module 109, 110. For example, an airfoil 12 may include an electronic module 109, 110, which may comprise a sensor to monitor crops over which the UAV 100 may be flown. A magnetic connector 51 (FIGS. 4, 21-24) may be electronically coupled to the electrical leads 61 of the sensor module electronic module 109, 110, to provide electrical communication between the magnetic connectors 51 and the electronic module 109, 110, in the airfoil 12. When the airfoil 12 is magnetically coupled to the fuselage so that the connection ports 24 of the airfoil 12 align with the connection ports 24 of the fuselage 11, and when a housing element 80, 81, comprising an electronic module 109, 110, with magnetic connectors 51 electrically coupled to its electrical leads 61 is removably positioned within the fuselage 11 so that connection ports 24 on the housing element 80, 81, also align with connection ports 24 on the fuselage 11, one or more magnetic connectors 51 may extend through the fuselage 11 connection ports 24 to contact and provide electrical communication between the sensor electronic module 109, 110, in the airfoil 12 and the electronic module 109, 110, in the fuselage 11. In still further embodiments, an elongated or relatively long magnetic connector 51 may extend through a connection port 24 of the fuselage 11 to contact a magnetic connector 51 in the airfoil 12 and to contact a magnetic connector in the housing element 80, 81, within the fuselage 11.

FIG. 6 shows a block diagram of some components of an example of an unmanned aerial vehicle 100 according to various embodiments described herein. The cavity 18 (FIGS. 1, 2, and 5) of the fuselage 11 may receive one or more electronic modules which may be inserted therein. Drones typically comprise one or more electronic modules which may provide various functions and capabilities. For example, a drone, and therefore the UAV 100, may comprise: an engine module 103 which may include a motor and one or more propellers or other motive devices; an engine speed control unit module 104 which may govern the speed of the engine module 103; a radio receiver module 105 which may send and receive wireless commands from the controller of the drone and also relay or control one or more functions of one or more other electronic modules; one or more communications modules 106 such as an autopilot module, a GPS module, and any other module suitable for use with a drone; and/or a battery module 107 which may include a power source such as a battery which may provide electric power to one or more of the electronic modules. One or more electronic modules may be removably positioned within the cavity 18 by inserting and withdrawing the modules into and from the cavity 18. In some embodiments, the fuselage 11 may comprise a first electronic module removably positioned within the cavity 18. In further embodiments, the fuselage may comprise a second, third, fourth, fifth, sixth, seventh, or more electronic modules removably positioned within the cavity 18.

In some embodiments, the fuselage 11 may comprise one or more housing elements 13, 14, 15, 16, 17. In further embodiments, one or more electronic modules 103, 104, 105, 106, 107, may be coupled to a housing element 13, 14, 15, 16, 17. For example: an engine module 103 may be coupled to an engine module housing element 13; an engine speed control unit module 104 may be coupled to an engine speed control module housing element 14; a radio receiver module 105 may be coupled to a receiver module housing element 15; one or more communications modules 106 may be coupled to a communications module housing element 16; and a battery module 107 may be coupled to a battery module housing element 17. In still further embodiments, two or more electronic modules 103, 104, 105, 106, 107, may be coupled to any housing element 13, 14, 15, 16, 17.

Each airfoil 12 may comprise a servo module 108. Servo modules typically comprise a small motor or other motive device which may control the position or motion of a control surface 43 of an airfoil 12. A servo module may be positioned anywhere on or within an airfoil 12. In some embodiments, the fuselage 11 may comprise zero, one, two, three, four or more engine modules 103, engine speed control unit modules 104, radio receiver modules 105, communications modules 106, battery modules 107, and/or servo modules 108. In further embodiments, the fuselage 11 may comprise zero, one, two, three, four or more engine module housing elements 13, engine speed control module housing elements 14, receiver module housing elements 15, communications module housing elements 16, battery module housing elements 17 and/or airfoils 12.

As shown in FIG. 6, each electronic module 103, 104, 105, 106, 107, 108, may be in electronic communication 50 with one or more other electronic modules 103, 104, 105, 106, 107, 108. For example, the radio receiver module 105 may be in electronic communication 50 with the servo modules 108, with one or more communications modules 106, with the battery module 107, and/or with the engine speed control unit module 104. Further, a battery module 107 may be in electronic communication 50 with one or more communications modules 106, a radio receiver module 105, and/or an engine speed control unit module 104. Still further, an engine speed control unit module 104 may be in electronic communication 50 with one or more engine modules 103.

In some embodiments, electronic communication 50 may be provided by a magnetic connector 50. In further embodiments, electronic communication 50 between a first electronic module and a second electronic module may be provided by the contact between one or more magnetic connectors 51 electronically coupled to the electrical leads of the first electronic module and one or more magnetic connectors 51 electronically coupled to the electrical leads of the second electronic module. For example, an engine module 103 may comprise a positive electrical lead, negative electrical lead, and a data electrical lead and an engine speed control unit module 104 may also comprise a positive electrical lead, negative electrical lead, and a data electrical lead. By providing electrical communication between the leads of the engine module 103 and the engine speed control unit module 104, the functioning of the engine module 103 may be controlled by the engine speed control unit module 104. In this example the electronic communication 50 may comprise six magnetic connectors 51 with each magnetic connector 51 electronically coupled, such as by soldering, to a single electrical lead of the engine module 103 or the engine speed control unit module 104. By contacting the magnetic connector 51 electronically coupled to the positive electrical lead of the engine module 103 to the magnetic connector 51 electronically coupled to the positive electrical lead of the engine speed control unit module 104, positive electronic communication 50 may be established. By contacting the magnetic connector 51 electronically coupled to the negative electrical lead of the engine module 103 to the magnetic connector 51 electronically coupled to the negative electrical lead of the engine speed control unit module 104, negative electronic communication 50 may be established. By contacting the magnetic connector 51 electronically coupled to the data electrical lead of the engine module 103 to the magnetic connector 51 electronically coupled to the data electrical lead of the engine speed control unit module 104, data electronic communication 50 may be established. In further embodiments, electronic communication 50 may comprise, one, two, three, four, five, six, seven, eight, nine, ten, or more, such as a plurality, of electrical connections between two or more electronic modules with each electrical connection provided by the contact of a magnetic connector 51 electrically coupled to a first electronic module 103, 104, 105, 106, 107, 108, with a magnetic connector 51 electrically coupled to a second electronic module 103, 104, 105, 106, 107, 108.

In some embodiments, a first electronic module 103, 104, 105, 106, 107, 108, may comprise a magnetic connector 51 electronically coupled to each of its respective electrical leads 61 (FIG. 24) and a second electronic module 103, 104, 105, 106, 107, 108, may comprise a magnetic connector 51 electronically coupled to each of its respective electrical leads 61. The first electronic module 103, 104, 105, 106, 107, 108, may be removably positioned adjacent to the second electronic module 103, 104, 105, 106, 107, 108, within the cavity 18. When the first and second electronic modules 103, 104, 105, 106, 107, 108, are removably positioned adjacent to each other within the cavity 18, then each magnetic connector 51 of the first electronic module 103, 104, 105, 106, 107, 108, may contact a magnetic connector 51 of the second electronic module 103, 104, 105, 106, 107, 108, thereby establishing electronic communication 50 between the first and second electronic modules 103, 104, 105, 106, 107, 108.

Turning now to FIGS. 7-20, various embodiments of housing elements are depicted. Generally, a housing element 13, 14, 15, 16, 17, may comprise a cavity contacting surface 71 configured to contact the interior cavity wall 19 (FIGS. 1, 2, and 5), an electronic module receptacle 72, and a connection port 24. In further embodiments, a housing element 13, 14, 15, 16, 17, may comprise an optional forward cavity contacting surface 71A, an optional longitudinal cavity contacting surface 71B, and an optional aft cavity contacting surface 71C. A forward cavity contacting surface 71A may be provided by a forward bulkhead 73, while an aft cavity contacting surface 71C may be provided by an aft bulkhead 74. A longitudinal cavity contacting surface 71B may be provided by a longitudinal strut 75. Additionally, a housing element 13, 14, 15, 16, 17, may comprise one or more optional auxiliary struts 76 which may be coupled to cavity contacting surface 71A, 71B, 71C, and or one or more other auxiliary struts 76 to form an electronic module receptacle 72.

Each housing element 13, 14, 15, 16, 17, may comprise one or more cavity contacting surfaces 71. In some embodiments, a cavity contacting surface 71A, 71B, 71C, may contact portions of the cavity 18 (FIGS. 1, 2, and 5) when its respective housing element 13, 14, 15, 16, 17, is inserted into the cavity 18. One or more cavity contacting surface 71A, 71B, 71C, may contact portions of the interior cavity wall 19 to guide the housing element 13, 14, 15, 16, 17, during insertion and removal from the cavity 18. For example, an optional forward cavity contacting surface 71A may contact a relatively forward portion of the interior cavity wall 19, an optional aft cavity contacting surface 71C may contact a relatively rearward portion of the interior cavity wall 19, and an optional longitudinal cavity contacting surface 71B may contact a portion of the interior cavity wall 19 between the optional forward cavity contacting surface 71A and optional aft cavity contacting surface 71C when the housing element 13, 14, 15, 16, 17, is inserted into the cavity 18. In further embodiments, each cavity contacting surface 71C may be complementarily shaped to a portion of the interior cavity wall 19.

Each housing element 13, 14, 15, 16, 17, may comprise one or more electronic module receptacles 72. An electronic module receptacle 72 may comprise a dock, depression, cavity, chamber, pocket, void, or other area into which an electronic module 103, 104, 105, 106, 107, may be received. In some embodiments, an electronic module receptacle 72 may be formed by one or more cavity contacting surfaces 71, forward bulkheads 73, aft bulkheads 74, longitudinal struts 75, and/or auxiliary struts 76. In further embodiments, an electronic module 103, 104, 105, 106, 107, may be coupled to a housing element 13, 14, 15, 16, 17, by inserting the electronic module 103, 104, 105, 106, 107, into an electronic module receptacle 72 and then coupling the electronic module 103, 104, 105, 106, 107, to one or more cavity contacting surfaces 71, forward bulkheads 73, aft bulkheads 74, longitudinal struts 75, and/or auxiliary struts 76.

Each housing element 13, 14, 15, 16, 17, may comprise one or more connection ports 24. A connection port 24 may comprise an aperture which may pass through one or more structural components of a housing element 13, 14, 15, 16, 17, such as through a cavity contacting surface 71 including an optional forward cavity contacting surface 71A, optional longitudinal cavity contacting surface 71B, optional aft cavity contacting surface 71C, electronic module receptacle 72, forward bulkhead 73, aft bulkhead 74, and/or longitudinal strut 75. Each connection port 24 may receive all or a portion of a magnetic connector 51 (FIGS. 21-24), thereby allowing a magnetic connector 51 to extend through portions of the housing element 13, 14, 15, 16, 17.

Figure 7:
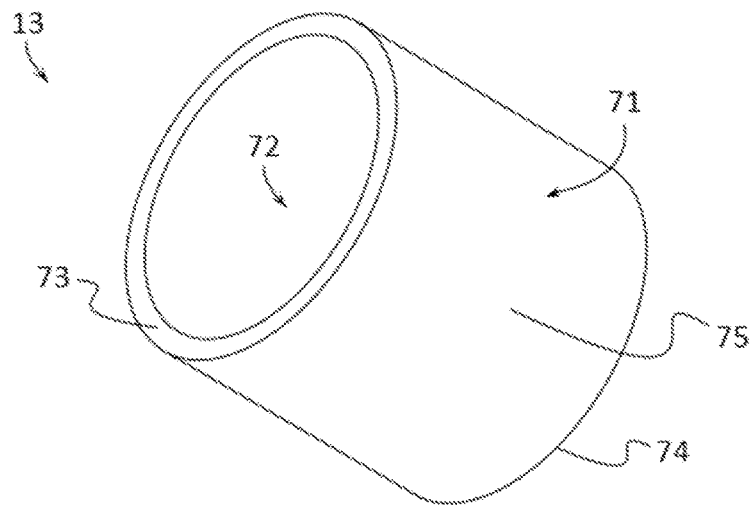
FIG. 7 depicts a front perspective view of an example of a housing element configured to receive an engine module according to various embodiments described herein.
Figure 8:
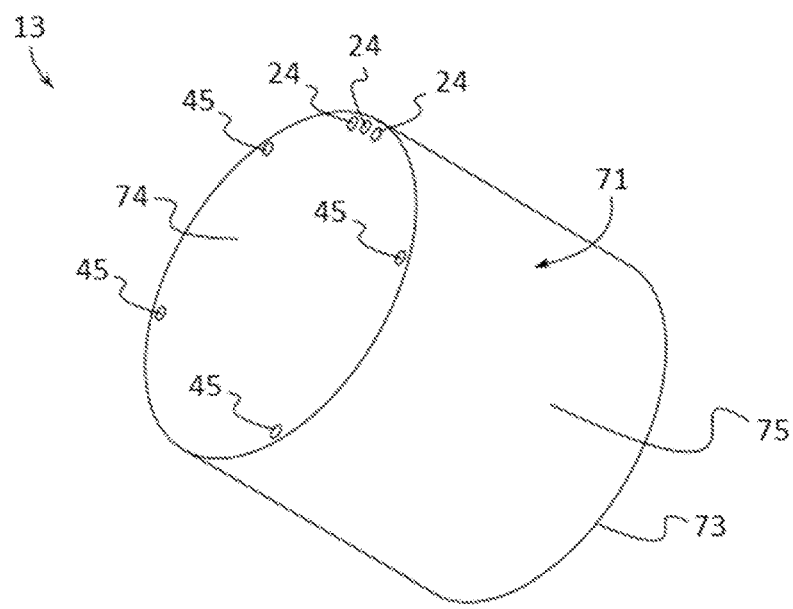
FIG. 8 illustrates a rear perspective view of an example of a housing element configured to receive an engine module according to various embodiments described herein.

FIGS. 7 and 8 illustrate an example of a housing element configured to receive an engine module 103 (FIG. 6), herein referred to as an engine module housing element 13, according to various embodiments described herein. In some embodiments, an engine module housing element 13 may comprise a cavity contacting surface 71 configured to contact the interior cavity wall 19 (FIGS. 1, 2, and 5) when the engine module housing element 13 is inserted into the cavity 18 (FIGS. 1, 2, and 5). The engine module housing element 13 may also comprise an electronic module receptacle 72 which may be configured or shaped to receive one or more engine modules 103. Optionally, an engine module 103 may be secured within the electronic module receptacle 72 by inserting one or more fasteners through one or more fastener apertures 45 to mate with and the engine module 103. In this and further embodiments, an engine module housing element 13 may comprise one or more, such as three, connection ports 24.

When removably positioned within the cavity 18, an engine module housing element 13 may be positioned forward and adjacent to an engine speed control module housing element 14 (FIGS. 1, 6, and 9-11) which may be also removably positioned within the cavity 18 so that the connection ports 24 of the engine module housing element 13 align with the connection ports 24 of the engine speed control module housing element 14. A magnetic connector 51 (FIGS. 21-24) may be electronically coupled to each electrical lead 61 (FIG. 24) of an engine module 103 (FIG. 6) received in the electronic module receptacle 72 of the engine module housing element 13, and a magnetic connector 51 (FIGS. 21-24) may be electronically coupled to each electrical lead 61 (FIG. 24) of an engine speed control unit module 104 (FIG. 6) received in the electronic module receptacle 72 of the engine speed control unit module 104. Once the connection ports 24 are aligned, and each magnetic connector 51 of the engine module 103 are in contact with each magnetic connector 51 of the engine speed control unit module 104, electronic communication 50 (FIG. 6) may be established between the engine module 103 and the engine speed control unit module 104 when the two housing elements 103, 104, are removably positioned adjacent to each other within the cavity 18.

Figure 9:
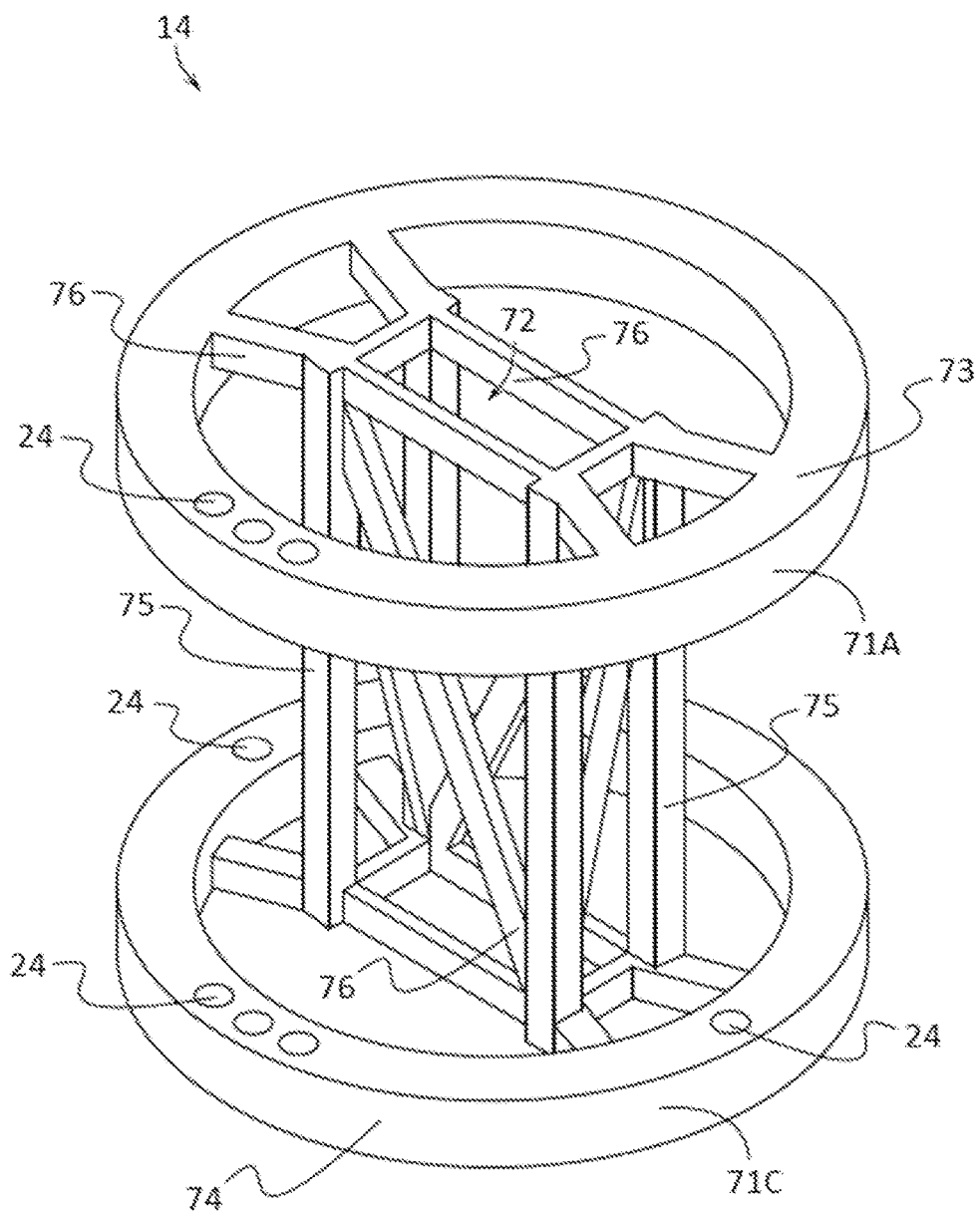
FIG. 9 shows a perspective view of an example of a housing element configured to receive an engine speed control module according to various embodiments described herein.
Figure 10:
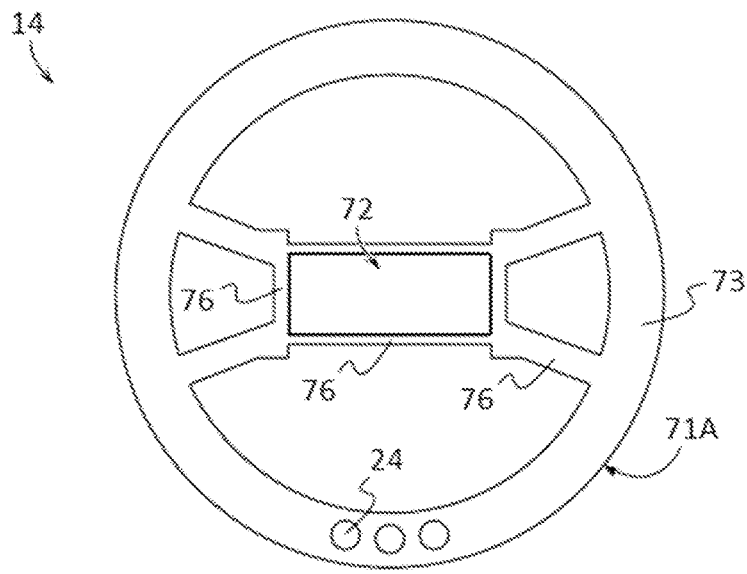
FIG. 10 depicts a front plan view of an example of a housing element configured to receive an engine speed control module according to various embodiments described herein.
Figure 11:
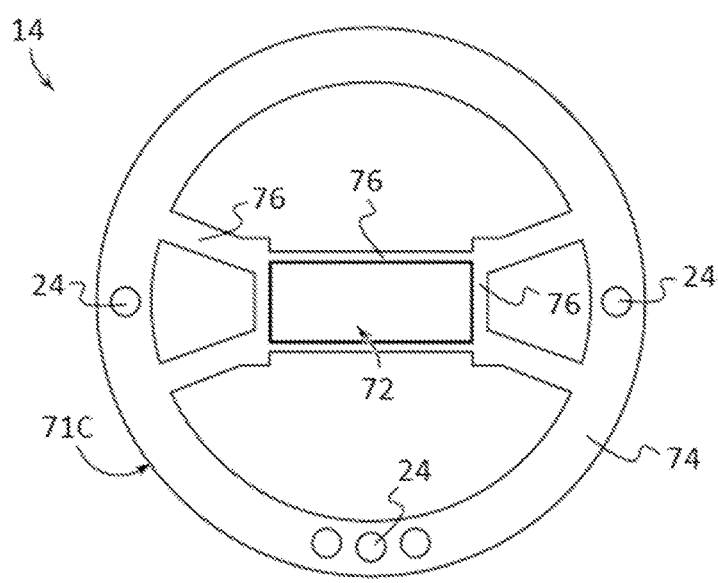
FIG. 11 illustrates a rear plan view of an example of a housing element configured to receive an engine speed control module according to various embodiments described herein.

FIGS. 9-11 show an example of a housing element configured to receive an engine speed control module 104 (FIG. 6), herein referred to as an engine speed control module housing element 14, according to various embodiments described herein. In some embodiments, an engine speed control module housing element 14 may comprise an optional forward cavity contacting surface 71A and/or an optional aft cavity contacting surface 71C which are configured to contact the interior cavity wall 19 (FIGS. 1, 2, and 5) when the engine speed control module housing element 14 is inserted into the cavity 18 (FIGS. 1, 2, and 5). The engine speed control module housing element 14 may also comprise an electronic module receptacle 72 which may be configured or shaped to receive one or more engine speed control modules 104. The engine speed control module 104 may be secured within the electronic module receptacle 72 by coupling the engine speed control module 104 to one or more portions of the engine speed control module housing element 14. In this and further embodiments, an engine speed control module housing element 14 may comprise one or more, such as five, connection ports 24.

When removably positioned within the cavity 18, an engine speed control module housing element 14 may be positioned between an engine module housing element 13 (FIGS. 1, 6-8) and a receiver module housing element 15 which may be also removably positioned within the cavity 18 so that the connection ports 24 of the engine speed control module housing element 14 align with the connection ports 24 of the engine module housing element 13 and the connection ports 24 of the receiver module housing element 15. Once the connection ports 24 are aligned and removably positioned adjacent to each other within the cavity 18, the magnetic connectors 51 of engine speed control unit module 104 may contact with each magnetic connector 51 of both the engine module 103 and the radio receiver module 105, thereby establishing electronic communication 50 (FIG. 6) between both the engine module 103 and the engine speed control unit module 104 and between the engine speed control unit module 104 and the radio receiver module 105 when the three housing elements 103, 104, 105, are removably positioned adjacent to each other within the cavity 18.

Figure 12:
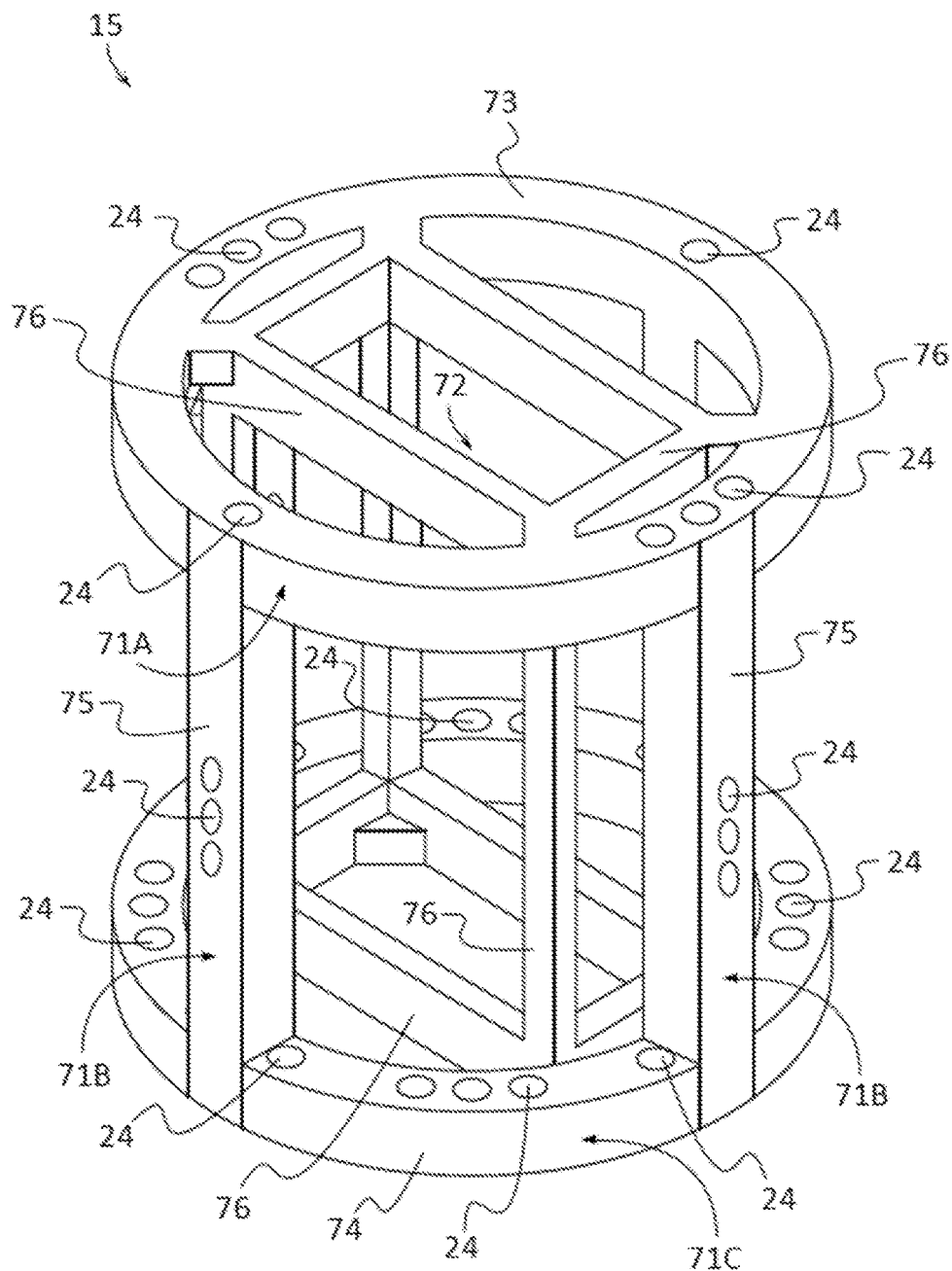
FIG. 12 shows a perspective view of an example of a housing element configured to receive a radio receiver module according to various embodiments described herein.
Figure 13:
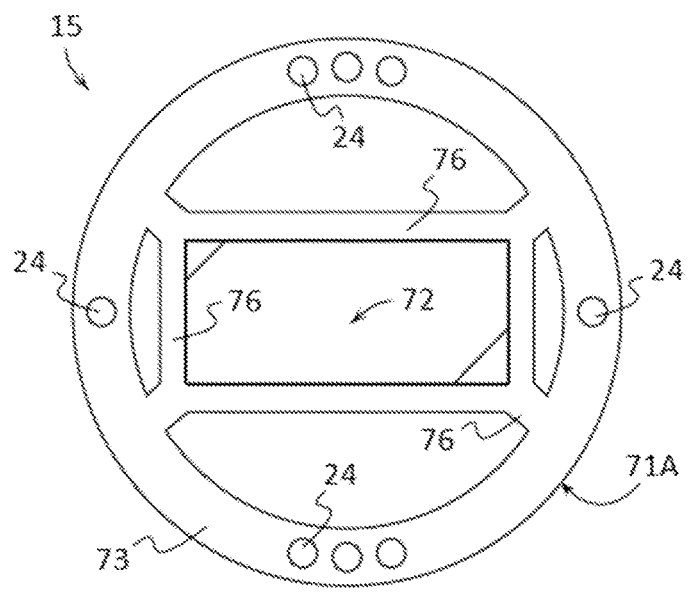
FIG. 13 depicts a front plan view of an example of a housing element configured to receive a radio receiver module according to various embodiments described herein.
Figure 14:
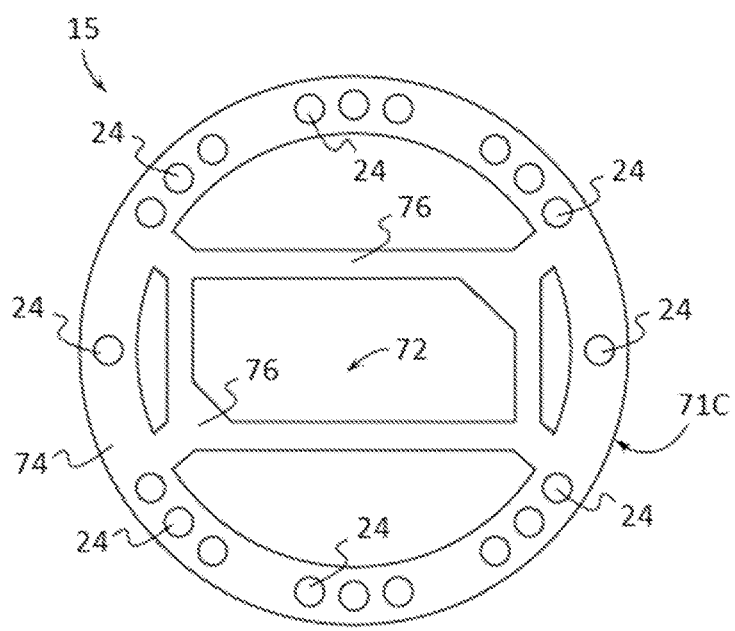
FIG. 14 illustrates a rear plan view of an example of a housing element configured to receive a radio receiver module according to various embodiments described herein.

FIGS. 12-14 illustrate an example of a housing element configured to receive a radio receiver module 105 (FIG. 6), herein referred to as a receiver module housing element 15, according to various embodiments described herein. In some embodiments, a receiver module housing element 15 may comprise an optional forward cavity contacting surface 71A and/or an optional aft cavity contacting surface 71C which are configured to contact the interior cavity wall 19 (FIGS. 1, 2, and 5) when the receiver module housing element 15 is inserted into the cavity 18 (FIGS. 1, 2, and 5). In further embodiments, a receiver module housing element 15 may comprise optional longitudinal cavity contacting surface 71B which may be configured to contact the interior cavity wall 19 (FIGS. 1, 2, and 5) when the receiver module housing element 15 is inserted into the cavity 18 (FIGS. 1, 2, and 5). The receiver module housing element 15 may also comprise an electronic module receptacle 72 which may be configured or shaped to receive one or more radio receiver modules 105. The radio receiver modules 105 may be secured within the electronic module receptacle 72 by coupling the radio receiver modules 105 to one or more portions of the receiver module housing element 15. In this and further embodiments, a receiver module housing element 15 may comprise one or more, such as forty one, connection ports 24.

When removably positioned within the cavity 18 (FIGS. 1, 2, 5), a receiver module housing element 15 may be positioned between an engine speed control module housing element 14 (FIGS. 1, 6, 9-11) and a communications module housing element 16 (FIGS. 1, 6, 15-17) which may be also removably positioned within the cavity 18 so that the connection ports 24 of the receiver module housing element 15 align with the connection ports 24 of the engine speed control module housing element 14 and with the connection ports 24 of the communications module housing element 16. Once the connection ports 24 are aligned and removably positioned adjacent to each other within the cavity 18, the magnetic connectors 51 of the radio receiver module 105 may contact with each magnetic connector 51 of both the engine speed control unit module 104 and the communications module 106, thereby establishing electronic communication 50 (FIG. 6) between the radio receiver module 105 and the engine speed control unit module 104 and between the radio receiver module 105 and the communications module 106 when the three housing elements 104, 105, 106, are removably positioned adjacent to each other within the cavity 18.

Additionally, the receiver module housing element 15 may comprise one or more connection ports 24 which may be positioned on an optional longitudinal cavity contacting surface 71B. Once the receiver module housing element 15 is removably positioned within the cavity 18 (FIGS. 1, 2, 5), one or more of the connection ports 24 on a longitudinal cavity contacting surface 71B may align with one or more connection ports 24 on the fuselage 11 (FIGS. 1, 2, 4-6) thereby allowing the magnetic connectors 51 (FIGS. 4, 21-24) in the connection ports 24 on a longitudinal cavity contacting surface 71B to extend through the fuselage 11 to contact the magnetic connectors 11 in the connection ports 24 of an airfoil 12. Once the magnetic connectors 51 of the radio receiver module 105 to contact the magnetic connectors 51 of a servo module 108 (FIG. 6), electronic communication 50 (FIG. 6) may be established between the radio receiver module 105 and the servo module 108.

Figure 15:
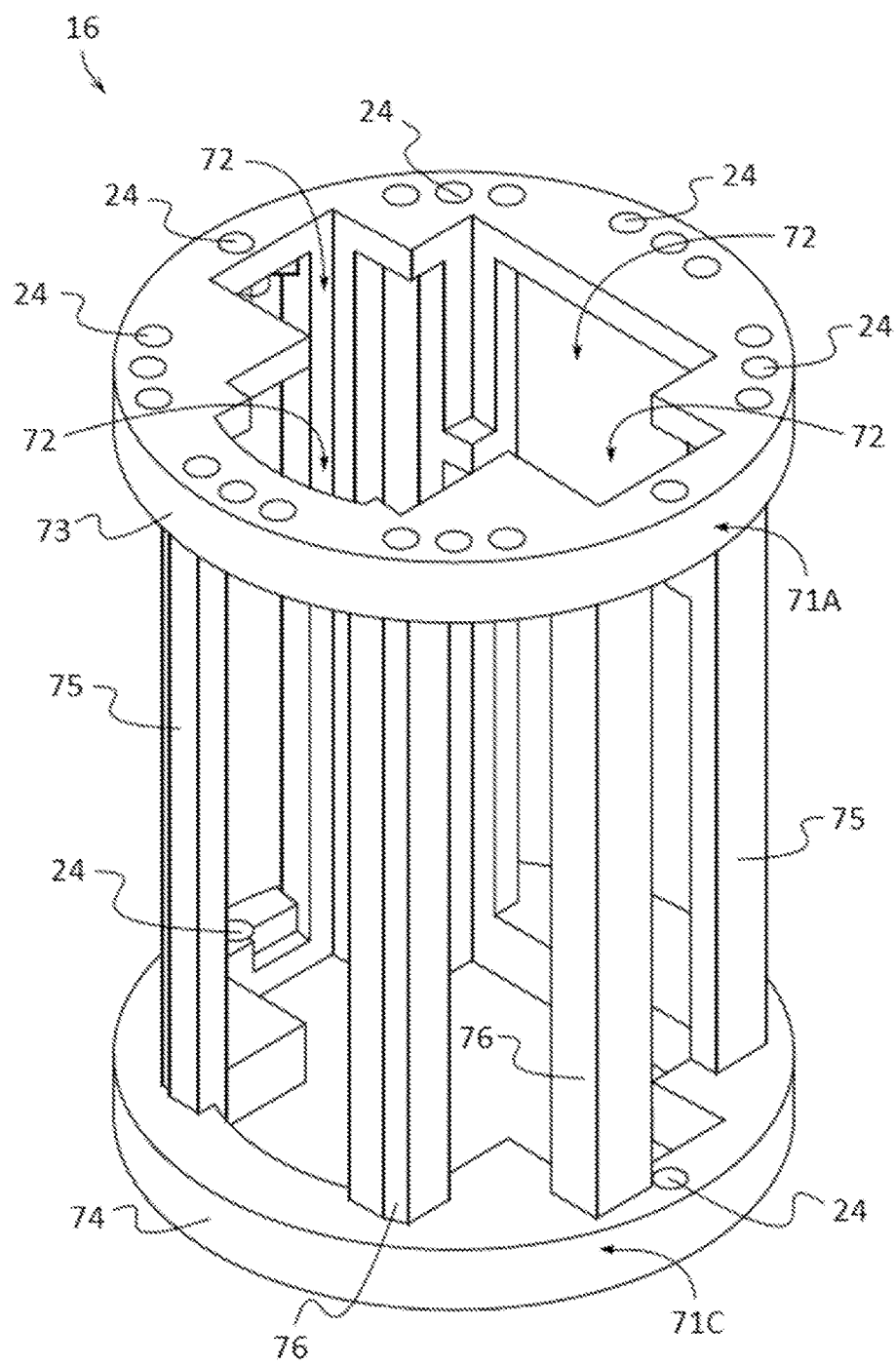
FIG. 15 shows a perspective view of an example of a housing element configured to receive a communications module according to various embodiments described herein.
Figure 16:
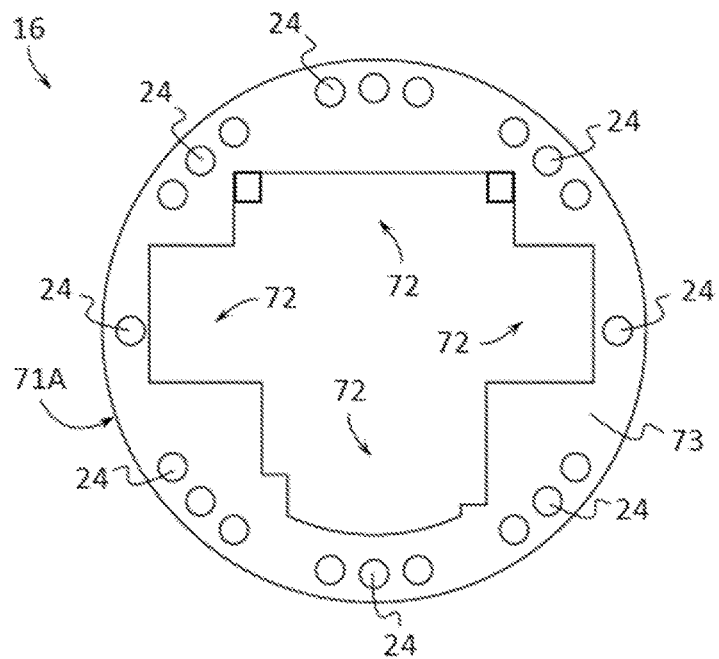
FIG. 16 depicts a front plan view of an example of a housing element configured to receive a communications module according to various embodiments described herein.
Figure 17:
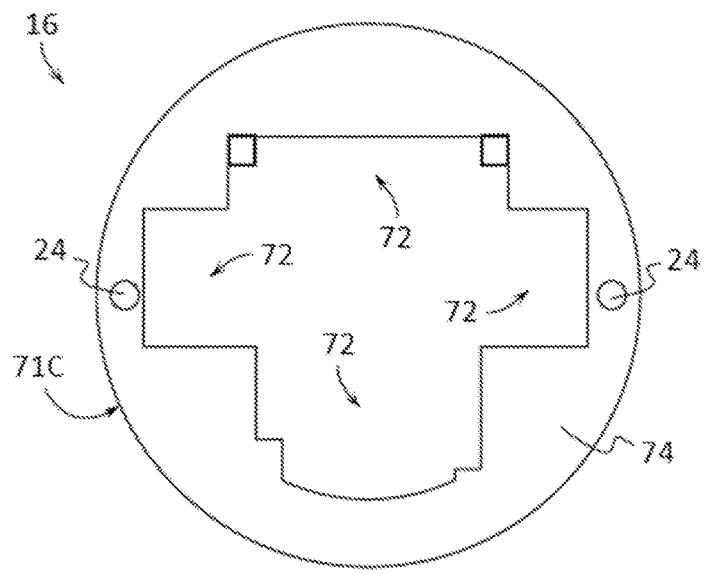
FIG. 17 illustrates a rear plan view of an example of a housing element configured to receive a communications module according to various embodiments described herein.

FIGS. 15-17 depict an example of a housing element configured to receive a communications module 106 (FIG. 6), herein referred to as a communications module housing element 16, according to various embodiments described herein. In some embodiments, a communications module housing element 16 may comprise an optional forward cavity contacting surface 71A and/or an optional aft cavity contacting surface 71C which are configured to contact the interior cavity wall 19 (FIGS. 1, 2, and 5) when the communications module housing element 16 is inserted into the cavity 18 (FIGS. 1, 2, and 5). The communications module housing element 16 may also comprise one or more electronic module receptacles 72 which may be configured or shaped to receive one or more communications modules 106 (FIG. 6), such as an autopilot module, a global positioning service (GPS) module, or any other module for use in a drone. A communications module 106 may be secured within the electronic module receptacle 72 by coupling the communications module 106 to one or more portions of the communications module housing element 16. In this and further embodiments, a communications module housing element 16 may comprise one or more, such as twenty two, connection ports 24.

When removably positioned within the cavity 18 (FIGS. 1, 2, 5), a communications module housing element 16 may be positioned between a receiver module housing element 15 (FIGS. 1,6, 12-14) and a battery module housing element 17 (FIGS. 1,6, 18-20) which may be also removably positioned within the cavity 18 so that the connection ports 24 of the communications module housing element 16 align with the connection ports 24 of the receiver module housing element 15 and with the connection ports 24 of the battery module housing element 17. Once the connection ports 24 are aligned and removably positioned adjacent to each other within the cavity 18, the magnetic connectors 51 of the one or more communications module 106 may contact with each magnetic connector 51 of both the radio receiver module 105 and the battery module 107, thereby establishing electronic communication 50 (FIG. 6) between the communications modules 106 and the radio receiver module 105 and between the communications modules 106 and the battery module 107 when the three housing elements 105, 106, 107, are removably positioned adjacent to each other within the cavity 18.

Figure 18:
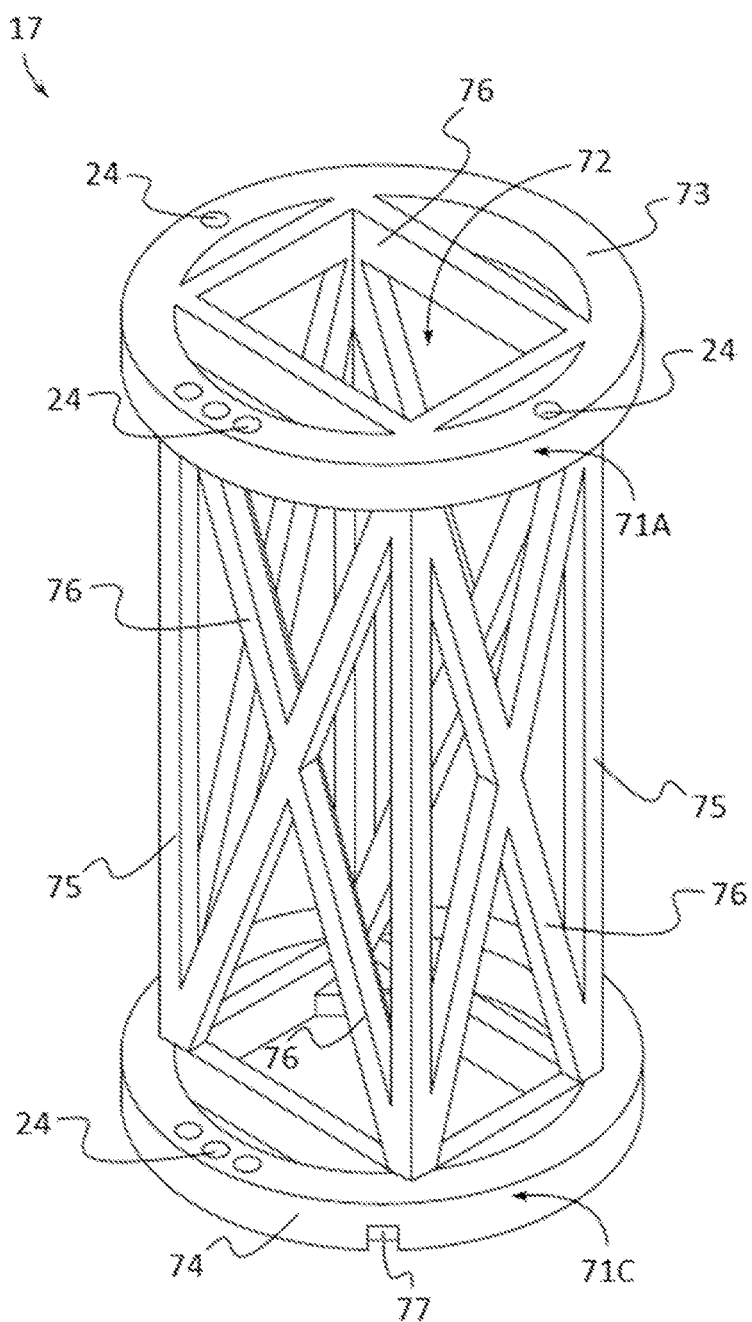
FIG. 18 shows a perspective view of an example of a housing element configured to receive a battery module according to various embodiments described herein.
Figure 19:
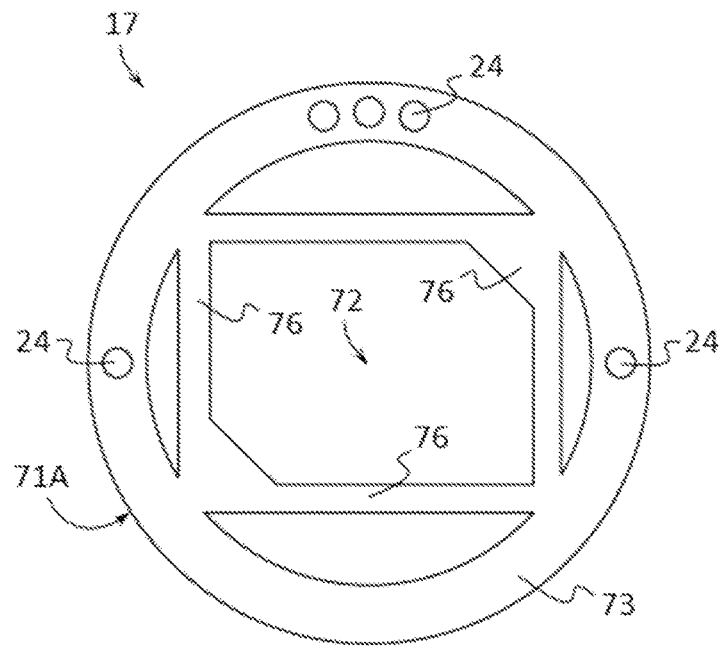
FIG. 19 depicts a front plan view of an example of a housing element configured to receive a battery module according to various embodiments described herein.
Figure 20:
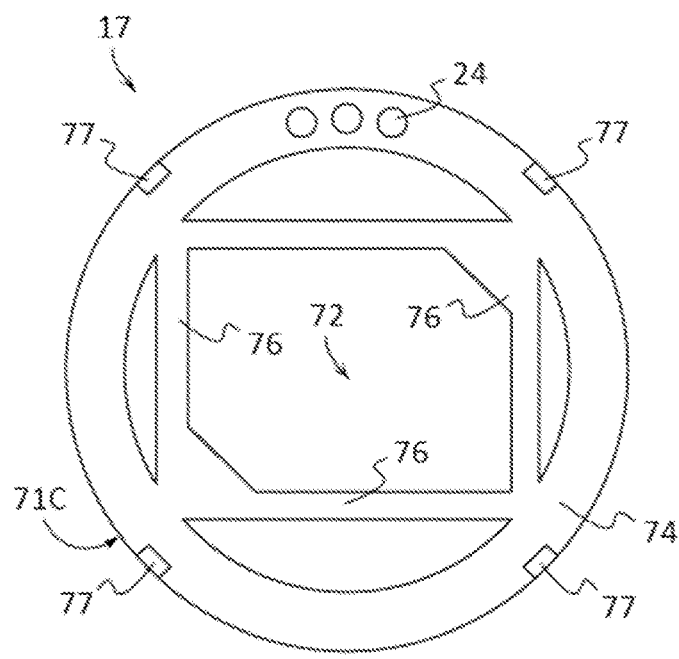
FIG. 20 illustrates a rear plan view of an example of a housing element configured to receive a battery module according to various embodiments described herein.

FIGS. 18-20 show an example of a housing element configured to receive a battery module 106 (FIG. 6), herein referred to as a battery module housing element 17, according to various embodiments described herein. In some embodiments, a battery module housing element 17 may comprise an optional forward cavity contacting surface 71A and/or an optional aft cavity contacting surface 71C which are configured to contact the interior cavity wall 19 (FIGS. 1, 2, and 5) when the battery module housing element 17 is inserted into the cavity 18 (FIGS. 1, 2, and 5). The battery module housing element 17 may also comprise an electronic module receptacle 72 which may be configured or shaped to receive one or more battery modules 107 (FIG. 6) or other power sources. A battery module 107 may be secured within the electronic module receptacle 72 by coupling the battery module 107 to one or more portions of the battery module housing element 17. In this and further embodiments, a battery module housing element 17 may comprise one or more, such as eight, connection ports 24.

When removably positioned within the cavity 18 (FIGS. 1, 2, 5), a battery module housing element 17 may be positioned rearward from a communications module housing element 16 (FIGS. 1, 6, 15-17) which may be also removably positioned within the cavity 18 so that the connection ports 24 of the communications module housing element 16 align with the connection ports 24 of battery module housing element 17. Once the connection ports 24 are aligned and removably positioned adjacent to each other within the cavity 18, the magnetic connectors 51 of the one or more communications modules 106 may contact with each magnetic connector 51 of both the battery module 107, thereby establishing electronic communication 50 (FIG. 6) between the communications modules 106 the battery module 107 and any other electronic module when the housing elements 106, 107, are removably positioned adjacent to each other within the cavity 18.

In further embodiments, the housing elements 13, 14, 15, 16, 17, may be placed in any other order within the cavity 18 (FIGS. 1, 2, and 5). In still further embodiments, one or more connection ports 24 in a housing element 13, 14, 15, 16, 17, may comprise a magnetic connector 51 (FIGS. 21-24) that is not electronically coupled to an electronic module 103, 104, 105, 106, 107, 108, within that housing element 13, 14, 15, 16, 17, thereby allowing the electronic communication 50 (FIG. 6) from one or more adjacent housing elements 13, 14, 15, 16, 17, to both bypass connection with a module electronic module 103, 104, 105, 106, 107, 108, within that housing element 13, 14, 15, 16, 17, to also pass through that housing element 13, 14, 15, 16, 17. For example, a first magnetic connector 51 (FIGS. 21-24) may be electronically coupled to an electrical lead 61 (FIG. 24) of a battery module 107 and a second magnetic connector 51 may be electronically coupled to an electrical lead 61 of an engine speed control unit module 104. One or more, such as a third, fourth, etc., magnetic connectors 51 may extend through one or more connection ports 24 of one or more housing elements 13, 14, 15, 16, 17, without being electrically coupled to their respective electronic modules, which may be positioned between the battery module 107 and the engine speed control unit module 104 to electronically couple the battery module 107 and the engine speed control unit module 104. In another example, a first magnetic connector 51 may be electronically coupled to an electrical lead 61 of a battery module 107 and a second magnetic connector 51 may be electronically coupled to an electrical lead 61 of a radio receiver module 105. One or more, such as a third, fourth, etc., magnetic connectors 51 may extend around or through one or more housing elements 13, 14, 15, 16, 17, without being electrically coupled to their respective electronic modules or without extending through their respective connection ports 24, which may be positioned between the battery module 107 and the radio receiver module 105 to electronically couple the battery module 107 and the radio receiver module 105.

Figure 21:
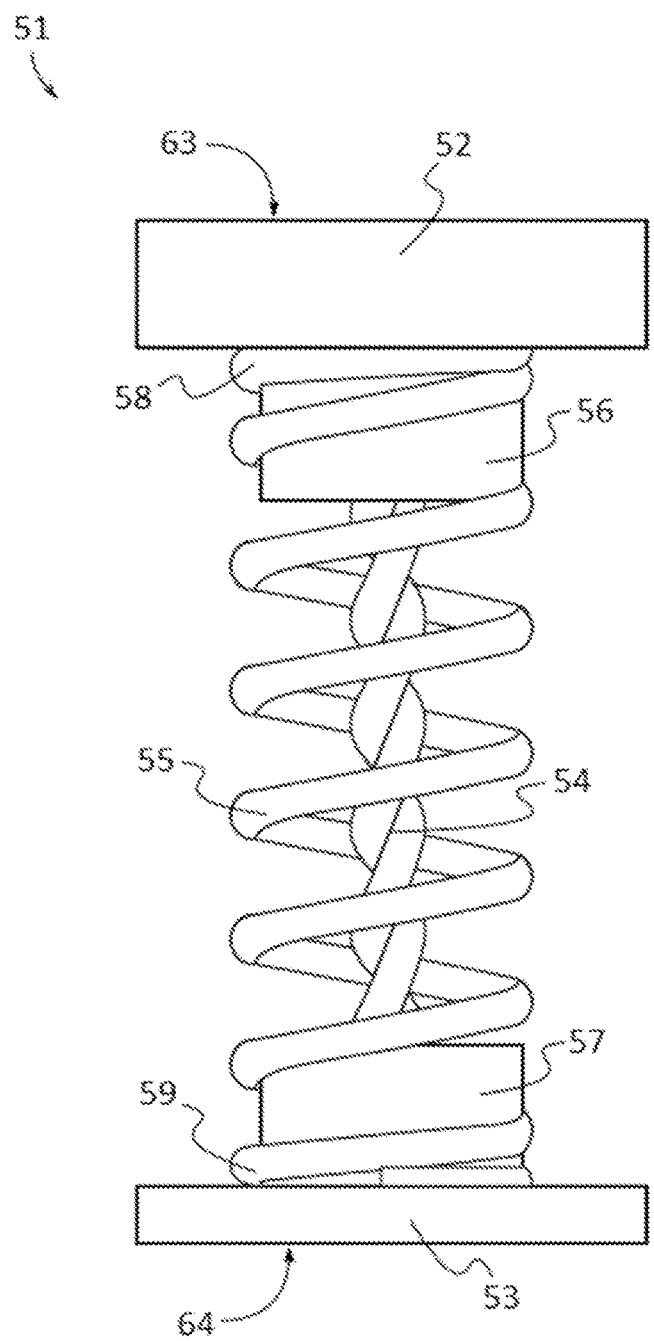
FIG. 21 shows an elevation view of an example of a magnetic connector according to various embodiments described herein.

FIGS. 21-22 depict an example of a magnetic connector 51 according to various embodiments described herein. In some embodiments, a magnetic connector 51 may comprise a first end 52 and a second end 53 which are electronically coupled together by an electrical conduit 54 such as a wire.

A first end 52, a second end 53, and an electrical conduit 54 may be made from an electronically conductive material such as copper, aluminum, steel, other metals and metal alloys, electrically conductive ceramics, or any other electrically conductive material. In further embodiments, a first end 52 and/or a second end 53 may be made from a magnetic material that is also electrically conductive, such as "rare earth", or neodymium iron boron (NIB) magnets which may be coated in nickel, or any other electrically conductive magnetic material. In some embodiments, the electrical conduit 54 may be formed into a spring thereby allowing the electrical conduit 54 to allow the first end 52 and the second end 53 to be contracted towards each other and also extended away from each other.

In some embodiments, a first end 52 may comprise a first electrically conductive surface 63 and a second end 53 may comprise a second electrically conductive surface 64. In further embodiments, a first electrically conductive surface 63 of a first magnetic connector 51 may contact the first electrically conductive surface 63 of a second magnetic connector 51. In further embodiments, a second electrically conductive surface 64 of a magnetic connector 51 may be electrically coupled to an electrical lead 61 (FIG. 24) of an electronic module 103, 104, 105, 106, 107, 108. In alternative embodiments, a second electrically conductive surface 64 of a first magnetic connector 51 may contact the second electrically conductive surface 64 of a second magnetic connector 51. In further embodiments, a first electrically conductive surface 63 of a magnetic connector 51 may be electrically coupled to an electrical lead 61 (FIG. 24) of an electronic module 103, 104, 105, 106, 107, 108.

In further embodiments, a magnetic connector 51 may comprise a flexible and resilient spring 55. A spring 55 may be coupled, optionally electrically coupled, to the first end 52 and/or the second end 53 to allow the first end 52 and the second end 53 to be contracted towards each other and also extended away from each other. In some embodiments, a spring 55 may be made from an electrically conductive material such as metal and metal alloys and/or made from non-electrically conductive materials such as plastics.

In further embodiments, a magnetic connector 51 may comprise a first anchor 56 and/or a second anchor 57. Optionally a first anchor 56 may be electrically coupled to a first end 52 and electrically coupled to a spring 55 and/or to the electrical conduit 54, thereby allowing the first anchor 56 to electrically couple the electrical conduit 54 to the first end 52. Likewise and optionally, a second anchor 57 may be electrically coupled to a second end 53 and electrically coupled to a spring 55 and/or to the electrical conduit 54, thereby allowing the second anchor 57 to electrically couple the electrical conduit 54 to the second end 53. In some embodiments, a first anchor 56 and/or a second anchor 57 may be made from an electronically conductive material such as copper, aluminum, steel, other metals and metal alloys, electrically conductive ceramics, or any other electrically conductive material. In further embodiments, a first anchor 56 and/or a second anchor 57 may be made from a magnetic material that is also electrically conductive, such as "rare earth", or neodymium iron boron (NIB) magnets which may be coated in nickel, or any other electrically conductive magnetic material.

In some embodiments, a magnetic connector 51 may comprise a first electrically conductive magnet at a first end 52, in which the first end first end 52 and/or a first anchor 56 may be made from or comprise an electrically conductive magnetic material, and a second electrically conductive magnet at a second end 53, in which the second end 53 and/or a second anchor 57 may be made from or comprise an electrically conductive magnetic material. In further embodiments, a magnetic connector 51 may comprise a spring 55 with a first end 52 and a second end 53 and the first end 58 of the spring 55 may be coupled to the first end 52 of the magnetic connector 51 and the second end 59 of the spring 55 may be coupled to the second end 53 of the magnetic connector 51.

Turning now to FIGS. 23 and 24, in some embodiments, a housing element 13, 14, 15, 16, 17, may comprise one or more housing positioning magnets 77. As shown, a first housing element 80, which may be an engine module housing element 13, an engine speed control module housing element 14, a receiver module housing element 15, a communications module housing element 16, or a battery module housing element 17, and/or a second housing element 81, which may also be an engine module housing element 13, an engine speed control module housing element 14, a receiver module housing element 15, a communications module housing element 16, or a battery module housing element 17, may comprise one or more housing positioning magnets 77. In some embodiments, a housing positioning magnet 77 may be positioned anywhere on or within a housing element 80, 81, such as on or within a optional forward cavity contacting surface 71A (FIGS. 7-20), optional longitudinal cavity contacting surface 71B (FIGS. 7-20), optional aft cavity contacting surface 71C (FIGS. 7-20), forward bulkhead 73, aft bulkhead 74, longitudinal strut 75 (FIGS. 7-20), and/or auxiliary strut 76 (FIGS. 7-20).

Once a housing element 80, 81, is removably positioned within the cavity 18 (FIGS. 1, 2, and 5), a housing positioning magnet 77 may be magnetically engaged to an internal positioning magnet 23 (FIGS. 1, 2, and 5) within the fuselage 11 (FIGS. 1, 2, 4-6), thereby providing magnetic communication with an internal positioning magnet and the housing element 80, 81, comprising the housing positioning magnet 77. In further embodiments, a housing positioning magnet 77 from a first housing element 80 may magnetically engage a housing positioning magnet 77 from a second housing element 81 to magnetically couple the housing elements 80, 81, together. In further embodiments, a fuselage 11 may comprise a plurality of internal positioning magnet 23 along the fuselage 11 thereby allowing housing elements 80, 81, comprising a housing positioning magnet 77 to be maintained in various positions within the cavity 18 by the magnetic engagement between one or more internal positioning magnet 23 and one or more housing positioning magnet 77 to allow the center of gravity of the fuselage 11 containing the housing elements 80, 81, to be changed and maintained.

As shown in FIG. 23, the magnetic connectors 51 may be configured in a plurality of sizes and lengths. For example, relatively short magnetic connectors 51 may be inserted into the connection ports 24 of the housing elements 80, 81, and once the magnetic connectors 51 of the first housing element 80 are in contact with the magnetic connectors 51 of the second housing element 81 as shown in FIG. 24, electrical communication between the housing elements 80, 81, may be accomplished. In some embodiments, relatively long magnetic connectors 51 may extend through one or more connection ports 24. In further embodiments, relatively long magnetic connectors 51 may extend through one or more housing elements 80, 81, without passing through a connection port 24.

Referring now to FIG. 24, in some embodiments, a first electronic module 109 may be coupled to a first housing element 80 and a second electronic module 110 may be coupled to a second housing element 81. A first electronic module 109 and/or a second electronic module 110 may comprise an engine module 103, an engine speed control unit module 104, a radio receiver module 105, a communications module 106, a battery module 107, or a servo module 108. Each electronic module 109, 110, may comprise one or more electrical leads 61, such as wires, which may send and receive electrical communication from and to the electronic module 109, 110. In some embodiments, each electrical lead 61 of an electronic module 109, 110, may be electrically coupled, such as with solder or other electrical coupling method including being integrally formed together, with a magnetic connector 51 thereby providing electrical communication between a magnetic connector 51 and an electronic module 109, 110. By positioning the magnetic connectors 51 in the connection ports 24 and by removably positioning the first housing element 80 adjacent to the second housing element 81 so that the connection ports 24 align within the cavity 18 (FIGS. 1, 2, 5), the magnetic connectors 51 of the housing elements 80, 81, may contact each other and establish electronic communication between the housing elements 80, 81. Similarly, once the magnetic connectors 51 of the housing elements 80, 81, contact each other, electronic communication between the electronic modules 109, 110, may also be established.

In further embodiments, a first electronic module 109, comprising magnetic connectors 51 electrically coupled to its leads 61 may be inserted into the cavity 18 (FIGS. 1, 2, 5) without being coupled to a housing element 80, 81. The magnetic connectors 51 of the first electronic module 109 may contact the magnetic connectors 51 of a second electronic module 110, which may be optionally coupled to a housing element 80, 81, when the second electronic module 110 is also removably positioned adjacent to the first electronic module 109 in the cavity thereby establishing electronic communication between the electronic modules 109, 110.

In still further embodiments, an airfoil 12 may comprise an electronic module 109, 110, such as a servo module 108 (FIG. 6) and a magnetic connector 51 may be electronically coupled to the electrical leads 61 of the electronic module 109, 110, to provide electrical communication between the magnetic connectors 51 and the electronic module 109, 110, in the airfoil 12. When the airfoil 12 is magnetically coupled to the fuselage so that the connection ports 24 of the airfoil 12 align with the connection ports 24 of the fuselage 11, and when a housing element 80, 81, comprising an electronic module 109, 110, with magnetic connectors 51 electrically coupled to its electrical leads 61 is removably positioned within the fuselage 11 so that connection ports 24 on the housing element 80, 81, also align with connection ports 24 on the fuselage 11, one or more magnetic connectors 51 may extend through the fuselage 11 connection ports 24 to contact and provide electrical communication between the electronic module 109, 110, in the airfoil 12 and the electronic module 109, 110, in the fuselage 11. In still further embodiments, an elongated or relatively long magnetic connector 51 may extend through a connection port 24 of the fuselage 11 to contact a magnetic connector 51 in the airfoil 12 and to contact a magnetic connector in the housing element 80, 81, within the fuselage 11.

While some materials have been provided, in other embodiments, the elements that comprise the UAV 100 such as the fuselage 11, optional airfoils 12, and/or housing elements 80, 81, may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the UAV 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the UAV 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the UAV 100 may be coupled by being one of connected to and integrally formed with another element of the UAV 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An unmanned aerial vehicle the unmanned aerial vehicle comprising:
    a fuselage which includes a cavity formed by an interior cavity wall and a fuselage exterior wall, said cavity disposed within the fuselage;
    a first electronic module removably positioned within the cavity and electrically coupled to a first magnetic connector, the first magnetic connector comprising a first electrically conductive magnet at a first end;
    a second electronic module removably positioned within the cavity and electrically coupled to a second magnetic connector, the second magnetic connector comprising a second electrically conductive magnet at a second end; and
    wherein electronic communication between the first and second modules is provided by contact between the first end of the first magnetic connector and the second end of the second magnetic connector.

2. The unmanned aerial vehicle of claim 1, wherein electronic communication between the first electronic module and the second electronic module is established when the first and second electronic modules are removably positioned adjacent to each other within the cavity.

3. The unmanned aerial vehicle of claim 1, wherein the first magnetic connector comprises a spring with a spring first end and a spring second end, and wherein the spring first end is coupled to the first end of the first magnetic connector and the spring second end is coupled to a second end of the first magnetic connector.

4. The unmanned aerial vehicle of claim 3, wherein the fuselage comprises: an internal positioning magnet coupled to the interior cavity wall; a connection port extending from the interior cavity wall to the exterior wall through the fuselage; and an external positioning magnet coupled to the fuselage exterior wall.

5. The unmanned aerial vehicle of claim 4, further comprising a plurality of internal positioning magnets coupled to the interior cavity wall.

6. The unmanned aerial vehicle of claim 5, wherein a housing element comprises a housing positioning magnet, and wherein the position of the housing element within the cavity is changed by magnetically attracting the housing positioning magnet to different internal positioning magnets.

7. The unmanned aerial vehicle of claim 4, further comprising a plurality of external positioning magnets coupled to the fuselage exterior wall.

8. The unmanned aerial vehicle of claim 7, wherein the plurality of external positioning magnets comprises a first set of external positioning magnets and a second set of external positioning magnets.

9. The unmanned aerial vehicle of claim 8, further comprising an air foil which includes an air foil positioning magnet.

10. The unmanned aerial vehicle of claim 9, wherein the air foil and the fuselage are coupled together by the magnetic attraction of the air foil positioning magnet and the external positioning magnet.

11. The unmanned aerial vehicle of claim 10, wherein the position of the airfoil on the fuselage is changed by magnetically attracting an air foil positioning magnet to a different set of external positioning magnets.

12. The unmanned aerial vehicle of claim 11, wherein the air foil comprises a third electronic module and a magnetic connector, wherein the magnetic connector is in electrical communication with the third electronic module.

13. The unmanned aerial vehicle of claim 1, further comprising a first housing element, wherein the first electronic module is coupled to the first housing element.

14. The unmanned aerial vehicle of claim 13, further comprising a second housing element, wherein the second electronic module is coupled to the second housing element.

15. The unmanned aerial vehicle of claim 14, wherein the first housing element and second housing element are removably positioned within the cavity.

16. The unmanned aerial vehicle of claim 15, wherein electronic communication between the first electronic module and the second electronic module is established when the first and second housing elements are removably positioned adjacent to each other within the cavity.

* * * * *